US010674316B2

(12) United States Patent
Schadow et al.

(10) Patent No.: US 10,674,316 B2
(45) Date of Patent: Jun. 2, 2020

(54) SYSTEM, IN PARTICULAR PORTABLE POWER TOOL SYSTEM

(71) Applicant: Robert Bosch GmbH, Stuttgart (DE)

(72) Inventors: Joachim Schadow, Stuttgart (DE); Joern Stock, Leinfelden-Echterdingen (DE); Florian Esenwein, Leinfelden-Echterdingen (DE); Wolf-Bastian Poettner, Stuttgart (DE); Janina Meier, Reutlingen (DE); Juan Nogueira-Nine, Stuttgart (DE); Julian Bartholomeyczik, Reutlingen (DE); Kamil Pogorzelski, Stuttgart (DE); Martin Werner, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 15/534,565

(22) PCT Filed: Nov. 26, 2015

(86) PCT No.: PCT/EP2015/077773
§ 371 (c)(1),
(2) Date: Jun. 9, 2017

(87) PCT Pub. No.: WO2016/091605
PCT Pub. Date: Jun. 16, 2016

(65) Prior Publication Data
US 2017/0343966 A1 Nov. 30, 2017

(30) Foreign Application Priority Data
Dec. 9, 2014 (DE) .......................... 10 2014 225 332

(51) Int. Cl.
*H04W 4/029* (2018.01)
*H04W 4/02* (2018.01)
(Continued)

(52) U.S. Cl.
CPC ............. *H04W 4/029* (2018.02); *G05B 11/06* (2013.01); *G08B 21/02* (2013.01); *H04W 4/023* (2013.01); *H04W 4/80* (2018.02); *H04W 4/33* (2018.02)

(58) Field of Classification Search
CPC ........ G08B 25/04; G08B 21/02; G05B 11/06; H04W 4/04; H04W 4/0419; H04W 4/06; H04W 4/023; H04W 4/029
(Continued)

(56) References Cited

U.S. PATENT DOCUMENTS 8,611,321 B2 * 12/2013 Herrala ................. H04W 4/029
370/338
10,154,373 B2 * 12/2018 Grube ..................... H04W 8/22
(Continued)

FOREIGN PATENT DOCUMENTS

| CN | 101802882 A | 8/2010 |
| CN | 102004843 A | 4/2011 |

(Continued)

OTHER PUBLICATIONS

International Search Report corresponding to PCT Application No. PCT/EP2015/077773, dated Feb. 10, 2016 (German and English language document) (7 pages).

*Primary Examiner* — Eric Blount
(74) *Attorney, Agent, or Firm* — Maginot, Moore & Beck LLP

(57) ABSTRACT

The disclosure proceeds from a system, in particular from a portable power tool system, having at least one mobile functional module which has at least one communications unit for communicating electronic data, having at least one building infrastructure device which has at least one communications unit for communicating with the functional module, and having at least one control and/or regulation unit which is at least intended to use an evaluation of a communication between the functional module and the building infrastructure device to at least infer a position of the functional module. It is proposed that the functional module is at least intended to sense at least one article-specific parameter, a user-specific parameter and/or an environment-specific parameter and/or to transmit said parameter(s) at least to the building infrastructure device.

17 Claims, 8 Drawing Sheets

(51) Int. Cl.
*H04W 4/80* (2018.01)
*G05B 11/06* (2006.01)
*G08B 21/02* (2006.01)
*H04W 4/33* (2018.01)

(58) Field of Classification Search
USPC .......................................................... 340/540
See application file for complete search history.

(56) References Cited

U.S. PATENT DOCUMENTS

| | | | |
|---|---|---|---|
| 2003/0024992 A1* | 2/2003 | Lewis | G08B 21/02 235/472.01 |
| 2012/0136231 A1 | 5/2012 | Markel | |
| 2012/0326837 A1* | 12/2012 | Ajay | A61F 9/029 340/5.2 |
| 2013/0084882 A1 | 4/2013 | Khorashadi et al. | |
| 2013/0109375 A1* | 5/2013 | Zeiler | H04W 4/029 455/426.1 |
| 2013/0234893 A1 | 9/2013 | Kusakari et al. | |
| 2014/0266698 A1 | 9/2014 | Hall et al. | |

FOREIGN PATENT DOCUMENTS

| | | |
|---|---|---|
| CN | 103025238 A | 4/2013 |
| CN | 103338432 A | 10/2013 |
| CN | 103886247 A | 6/2014 |
| EP | 2 341 359 A1 | 7/2011 |
| JP | 2001-51717 A | 2/2001 |
| JP | 2008-146302 A | 6/2006 |
| JP | 2013-213804 A | 10/2013 |
| JP | 2013-214941 A | 10/2013 |
| JP | 2016-512639 A | 4/2016 |
| WO | 2014163890 A1 | 10/2014 |

* cited by examiner

SYSTEM, IN PARTICULAR PORTABLE POWER TOOL SYSTEM

This application is a 35 U.S.C. § 371 National Stage Application of PCT/EP2015/077773, filed on Nov. 26, 2015, which claims the benefit of priority to Serial No. DE 10 2014 225 332.2, filed on Dec. 9, 2014 in Germany, the disclosures of which are incorporated herein by reference in their entirety.

BACKGROUND

US 2013/0234893 A1 has already disclosed a system comprising a mobile functional module which has a communication unit for communicating electronic data. The system also has a building infrastructure apparatus which is in the form of a fire and/or smoke detector, for example, and has a communication unit for communicating with the functional module. The system also comprises a control and/or regulation unit which is intended to infer at least a position of the functional module on the basis of an evaluation of communication between the functional module and the building infrastructure apparatus.

SUMMARY

The disclosure is based on a system, in particular a portable power tool system, having at least one mobile functional module which has at least one communication unit for communicating electronic data, having at least one building infrastructure apparatus which has at least one communication unit for communicating with the functional module, and having at least one control and/or regulation unit which is at least intended to infer at least a position of the functional module on the basis of an evaluation of communication between the functional module and the building infrastructure apparatus.

It is proposed that the functional module is at least intended to record at least one object-specific characteristic variable, one operator-specific characteristic variable and/or one environment-specific characteristic variable and/or to transmit it/them at least to the building infrastructure apparatus. In particular, "intended" is supposed to be understood as meaning specially designed and/or specially equipped. In particular, the fact that an element and/or a unit is/are intended for a particular function is supposed to be understood as meaning that the element and/or the unit perform(s) and/or carry(carries) out this particular function in at least one application and/or operating state.

In this case, a "mobile functional module" is supposed to be understood as meaning, in particular, an element, a unit or an apparatus which is at least intended to output, store, process and/or communicate data, in particular electronic data, and, in particular, is not tied to a fixed location, for example is movable, mobile, portable, transportable or the like. The mobile functional module can preferably be arranged on an object or an individual (human, animal), in particular can be arranged such that it can be removed in a non-destructive manner. The mobile functional module can preferably be arranged in a removable manner on an object or an individual. However, it is also conceivable for the mobile functional module to be able to be arranged unreleasably on an object or an individual, for example as a result of the mobile functional module being integrated in the object or the individual. The mobile functional module can be arranged, in particular can be arranged such that it can be removed in a non-destructive manner, on an object which is in the form of a portable machine tool, an item of work equipment (ladder, trolley, transport pallet truck or the like), a storage container (fluid container, tool case, toolbox, briefcase or the like), a data processing unit (laptop, tablet, smartphone or the like), an item of clothing, a domestic appliance (cleaning machine, in particular autonomous vacuum cleaner, food processor or the like), a tool or the like or on an individual in the form of a person or an animal, for example. The functional module preferably comprises an energy storage unit, in particular a rechargeable battery unit, for supplying energy. The functional module also comprises at least one energy interface for recharging the energy storage unit. The energy interface may be wireless, in particular in the form of an inductive energy interface, or wired. It is also conceivable for the functional module to have an energy generation unit for generating energy, which energy generation unit is intended to supply energy to electrical components of the functional module and/or to feed energy to the energy storage unit. The energy generation unit is preferably intended to obtain energy from regenerative energy sources, from a movement and/or from further mechanical and/or electrical events. The energy generation unit may be in the form of a solar unit, a wind power unit, a piezo unit or the like.

The communication unit(s) of the mobile functional module and/or of the building infrastructure apparatus is/are preferably in the form of (a) wireless communication unit(s). In this case, the communication unit(s) may be in the form of a WLAN communication unit, a Bluetooth communication unit, a radio communication unit, an RFID communication unit, an NFC unit, an infrared communication unit, a mobile radio network communication unit, a Zigbee communication unit or the like. The communication unit(s) of the mobile functional module and/or of the building infrastructure apparatus is/are particularly preferably intended for bidirectional data transmission. In an alternative configuration, the communication unit(s) of the mobile functional module and/or of the building infrastructure apparatus is/are in the form of (a) wired communication unit(s), for example in the form of a LAN communication unit, a USB communication unit, a power line communication unit, a CAN bus communication unit, an Ethernet communication unit, a twisted pair cable communication unit (CAT5 or CAT6) or the like. However, it is also conceivable, as an alternative to wireless or wired communication, for the communication unit(s) of the mobile functional module and/or of the building infrastructure apparatus to be intended for wireless and wired communication. Communication between the communication unit of the functional module and the communication unit of the building infrastructure apparatus is preferably carried out in a wireless manner. In this case, the terms "transmit", "transfer" and/or "communicate" are supposed to define, in particular, transmission and/or reception of data, in particular electronic data. The communication between the functional module and the building infrastructure apparatus can be used, for example, to transmit data relevant to the working situation, for example a working time with a particular tool, in order to monitor and/or log the permissible period for which an operator is exposed to vibrations of a particular machine for example, for example emergency data and/or triggering data for a dead man monitoring unit, for example an item of information for a factory fire brigade if dangerous work is started in a region identified as sensitive in order to reduce sensitivity of a fire detector/fire detection unit or even to switch it off for a period in which the dangerous work is carried out, for example, or the like.

In this case, a "building infrastructure apparatus" is supposed to be understood as meaning, in particular, an apparatus which is intended to monitor, control, supply (energy supply, water supply or the like), record information, output information and/or illuminate a building and/or premises at least partially surrounding the building. The building infrastructure apparatus may be in the form of a signal generator (optical, acoustic and/or haptic), a camera, a motion detector, a public address apparatus, an access apparatus (electrical locking system, electrical access control system, code input unit, status display unit or the like), a fire and/or smoke detector, a gas monitoring apparatus, a lighting apparatus, a data transmission apparatus (router, radio system, part of a telephone system, door intercom system) or the like. The building infrastructure apparatus is preferably in the form of a building security apparatus and/or building fire detector. However, it is also conceivable for the building infrastructure apparatus to be in the form of another apparatus which appears to be useful to a person skilled in the art. The building infrastructure apparatus is preferably networked to a plurality of identical or different building infrastructure apparatuses by means of a network, in particular via a central computing unit which may be formed by the control and/or regulation unit, for example. The network is particularly preferably part of a building security system and/or a building fire detection system. Inside the network which is used to network the building infrastructure apparatus, provision is preferably made for electronic data to be transmitted in a wireless and/or wired manner. The building infrastructure apparatus may be connected to the network in a wired and/or wireless manner. Communication between the communication unit of the building infrastructure apparatus and the network of the building security system and/or of the building fire detection system is preferably carried out in a wired manner. The communication unit of the building infrastructure apparatus is preferably intended to communicate with the communication unit of the functional module and to communicate with the network of the building security system and/or of the building fire detection system. However, it is also conceivable for the building infrastructure apparatus to have at least two separate communication units, one of the communication units being intended to communicate with the functional module and one of the communication units being intended to communicate with the network of the building security system and/or of the building fire detection system. The network of the building security system and/or of the building fire detection system may be a field bus network, a LAN, a radio network, for example a WLAN, or another network which appears to be useful to a person skilled in the art. Communication between the functional module and the building infrastructure apparatus can be carried out in the network of the building security system and/or of the building fire detection system and/or in a separate communication network which can be operated, in particular, in parallel with the network of the building security system and/or of the building fire detection system. If the functional module and the building infrastructure apparatus communicate in a separate communication network, it can be advantageously ensured that a method of operation of the network of the building security system and/or of the building fire detection system is not influenced, at least to the greatest possible extent, by a method of operation of the separate communication network. In addition, if the functional module and the building infrastructure apparatus communicate in a separate communication network, access to the network of the building security system and/or of the building fire detection system by unauthorized persons, in particular hackers, can be advantageously avoided, at least to the greatest possible extent, if the separate communication network is infiltrated.

A "control and/or regulation unit" is supposed to be understood as meaning, in particular, a unit having at least one control electronics unit. A "control electronics unit" is supposed to be understood as meaning, in particular, a unit having a processor unit and a memory unit as well as an operating program stored in the memory unit. The control and/or regulation unit is preferably at least intended to store, manage, process and/or forward electronic data, in particular electronic data transmitted between the functional module and the building infrastructure apparatus. The control and/or regulation unit is preferably at least intended to infer at least a position of the functional module, in particular a position inside a building or inside premises which at least partially surround the building and are shielded, at least to the greatest possible extent, from reception and/or transmission of data from a global location determination apparatus, for example a GPS apparatus, independently of characteristic variables of a global location determination apparatus (GPS apparatus, GLONASS apparatus, Galileo apparatus, Beidou apparatus), at least to the greatest possible extent, on the basis of an evaluation of communication between the functional module and the building infrastructure apparatus. The control and/or regulation unit may be integrated in the functional module, in the building infrastructure apparatus or in another element or unit which appears to be useful to a person skilled in the art, for example a central computing unit of the building security system and/or of the building fire detection system or the like.

The expression "object-specific characteristic variable" is supposed to define here, in particular, a characteristic variable which defines an object, in particular with regard to at least a dimension, a nature, a state, a range of functions, a type of object or the like. The object-specific characteristic variable may be in the form of an identification characteristic variable (MAC address, IP address, object number, inventory number or the like), a height, a width, a depth, a volume, a type of material, a material property, a state, for example as good as new or used, an operating parameter for operating the object or the like. In this case, an "operator-specific characteristic variable" is supposed to be understood as meaning, in particular, a characteristic variable which defines at least one vital sign of an individual, a characteristic variable which affects an individual, and/or a characteristic variable which is dependent on a behavior of an individual, for example a movement behavior, a sleeping behavior, a daily routine, a work routine or the like. The operator-specific characteristic variable may be in the form of an operator-specific type of burden caused by an item of clothing, a noise and/or vibration burden, a pulse, a body temperature, a fatigue characteristic variable, an orientation characteristic variable, a movement characteristic variable or another operator-specific characteristic variable which appears to be useful to a person skilled in the art. In this case, an "environment-specific characteristic variable" is supposed to be understood as meaning, in particular, a characteristic variable which defines at least one environment surrounding the functional module. In this case, the environment-specific characteristic variable may be in the form of an ambient pressure, an ambient temperature, an ambient sound level, an ambient gas characteristic variable, an ambient voltage characteristic variable, an ambient moisture characteristic variable, an ambient acid and/or ambient base characteristic variable or another environment-specific characteristic variable which appears to be useful to a person skilled in the art.

In this case, the fact that "the functional module is at least intended to record at least one object-specific characteristic variable, one operator-specific characteristic variable and/or one environment-specific characteristic variable" is supposed to be understood as meaning, in particular, the fact that the characteristic variable(s) can be stored at least in a memory unit of the functional module on account of recording by means of sensors, on account of a manual input, for example by means of a keyboard, and/or on account of an electronic input, for example by means of NFC, by means of RFID, by means of USB or the like. The characteristic variable(s) stored in the memory unit can preferably be transmitted at least to the building infrastructure apparatus by means of the communication unit of the functional module. The characteristic variable(s) which can be transmitted to the building infrastructure apparatus can be transmitted to further network locations of the network and/or to further external locations via the network as a result of the building infrastructure apparatus being connected to the network of the building security system and/or of the building fire detection system. The transmitted characteristic variable(s) can preferably be evaluated by the control and/or regulation unit of the system according to the disclosure. The control and/or regulation unit is preferably connected, at least using data transmission technology, to the network of the building security system and/or of the building fire detection system. The control and/or regulation unit is preferably connected, at least using data transmission technology, to at least one further network, in particular the Internet, for example by means of a gateway, by means of a router or the like.

The configuration according to the disclosure of the system advantageously makes it possible to interchange characteristic variables of objects and/or of individuals with at least one existing building infrastructure apparatus, in particular a fire and/or smoke detector, in which case transmitted data can be used, in a very particularly advantageous manner, to monitor, control and/or manage the objects and/or the individuals. In addition, it is advantageously possible to record characteristic variables which can be used to output information, for monitoring, for control and/or for management. Furthermore, central processing of objects and/or individuals individually moving in a building and/or on premises surrounding the building can be advantageously achieved, in which case control operations, monitoring operations, management operations or the like can be advantageously initiated on the basis of recorded and/or transmitted characteristic variables on account of the central processing. In a particularly advantageous manner, the configuration according to the disclosure makes it possible to resort to an already existing building security system and/or building fire detection system, the building security system and/or the building fire detection system advantageously being able to be used to communicate data for the purpose of monitoring, management and/or protection.

It is also proposed that the functional module has at least one sensor unit which is intended to record at least one object-specific characteristic variable, one operator-specific characteristic variable and/or one environment-specific characteristic variable in an at least partially automatic manner. In this case, the expression "in an at least partially automatic manner" is supposed to define, in particular, performance and/or starting of a function of an element and/or of a unit which is independent, at least to the greatest possible extent, of a manual command input, in particular is independent of a manual command input by an individual for the purpose of carrying out and/or starting the recording of a characteristic variable. The at least one recorded object-specific characteristic variable, the at least one recorded operator-specific characteristic variable and/or the at least one recorded environment-specific characteristic variable is/are preferably transmitted to the control and/or regulation unit for evaluation, forwarding and/or processing. At least one recorded object-specific characteristic variable, at least one recorded operator-specific characteristic variable and/or at least one recorded environment-specific characteristic variable can be transmitted to the control and/or regulation unit for evaluation, forwarding and/or processing on the basis of a query command from the control and/or regulation unit, on the basis of expiry of a predetermined period and/or on the basis of an event which has occurred, for example absence of a prescribed object when entering a building or premises at least partially surrounding the building, detection of a hazard and/or disruption of the object and/or detection of a hazard for the individual on whom the functional module is arranged or the like.

At least one object-specific characteristic variable, at least one operator-specific characteristic variable and/or at least one environment-specific characteristic variable can be recorded in an at least partially automatic manner on the basis of expiry of a predetermined period, using a recording algorithm and/or using a recording command which can be centrally output, in particular, using the control and/or regulation unit. The sensor unit comprises at least one sensor element for recording at least one object-specific characteristic variable, at least one operator-specific characteristic variable and/or at least one environment-specific characteristic variable in an at least partially automatic manner. The sensor unit may have a multiplicity of different and/or identical sensor elements for recording at least one object-specific characteristic variable, at least one operator-specific characteristic variable and/or at least one environment-specific characteristic variable in an at least partially automatic manner. The sensor unit preferably comprises at least one motion sensor element which is intended to record at least one movement characteristic variable which differs from an acceleration. The sensor unit preferably comprises at least one acceleration sensor element which is intended to record at least one acceleration characteristic variable. In this case, the acceleration sensor element may be in the form of a multi-axis acceleration sensor element, in particular a three-axis acceleration sensor element, a rotational rate sensor element, a piezoelectric acceleration sensor element, an acceleration sensor element from a micro-electromechanical system (MEMS) or another acceleration sensor element which appears to be useful to a person skilled in the art.

The sensor unit advantageously comprises at least one temperature sensor element which is intended to record at least one temperature characteristic variable. The sensor unit also preferably comprises at least one temperature sensor element which is in the form of an ambient temperature sensor element and is intended to record an ambient temperature, in particular an ambient air temperature. The sensor unit preferably also comprises at least one vital function sensor element which is intended to record at least one vital characteristic variable of an individual. The vital characteristic variable may be, for example, a blood value, a pulse, a heartbeat, a bodily fluid composition of an individual or the like. The sensor unit preferably comprises at least one vital function sensor element which is in the form of a body temperature sensor element and is intended to record a body temperature of an individual on whom the functional module is arranged.

The sensor unit preferably also comprises at least one pressure sensor element which is intended to record at least one pressure characteristic variable. The sensor unit preferably also has at least one localization sensor element which is intended to record at least one position characteristic variable, in particular at least one global position characteristic variable. The sensor unit preferably comprises at least one sensor element which is in the form of a GPS sensor element and can be used to record a global position. However, it is also conceivable for the sensor unit to have another sensor element which appears to be useful to a person skilled in the art and is intended to record a position characteristic variable in the form of a global position, for example a compass localization sensor element, a Galileo localization sensor element, a GLONASS localization sensor element, a Beidou localization sensor element or the like. Alternatively or additionally, the sensor unit may have at least one further sensor element or a multiplicity of further sensor elements which is/are intended to record at least one object-specific characteristic variable, one operator-specific characteristic variable and/or one environment-specific characteristic variable in an at least partially automatic manner. The configuration according to the disclosure advantageously makes it possible to record characteristic variables in a reliable manner. It is therefore advantageously possible to reliably record a multiplicity of characteristic variables which can be used for at least partially automatic monitoring, use and/or management by means of the system.

It is also proposed that the control and/or regulation unit has at least one evaluation function which is at least intended to infer a vital state of an individual, in particular an operator of a portable machine tool or a wearer of an item of safety clothing, a burden on an individual, in particular an operator of a portable machine tool or a wearer of an item of safety clothing, and/or a potential risk to an individual, in particular an operator of a portable machine tool or a wearer of an item of safety clothing, at least on the basis of the data transmitted between the functional module and the building infrastructure apparatus. The evaluation function is also preferably at least intended to infer an operating state of an object, on which the functional module is arranged, at least on the basis of the data transmitted between the functional module and the building infrastructure apparatus. The burden on an individual, in particular an operator of a portable machine tool or a wearer of an item of safety clothing, may in this case be in the form of a work duration, a duration of a vibration which acts on an operator of a machine tool during an activity, a physical effort, for example lifting a large load, climbing stairs, covering a long distance, or another burden on an individual, in particular an operator of a portable machine tool or a wearer of an item of safety clothing, which appears to be useful to a person skilled in the art. For example, the sensor unit of the functional module, which is arranged on an individual, can be used to detect that the individual has fallen, for example, and is no longer moving. The evaluation function can preferably be used to evaluate whether there is an emergency situation. In addition, an emergency service can be informed, in particular in a manner automatically initiated by means of the control and/or regulation unit, which emergency service can be guided to the individual, in particular as a result of a position of the functional module being determined by evaluating communication between the functional module and the building infrastructure apparatus by means of the control and/or regulation unit and/or by evaluating recorded characteristic variables of the localization sensor element. Hazardous situations can be advantageously detected and an individual can be advantageously protected from hazards by means of the configuration according to the disclosure.

It is also proposed that the control and/or regulation unit has at least one access control function which is at least intended to monitor, enable or block access of an object and/or of an individual, in particular an operator of a portable machine tool or a wearer of an item of safety clothing, on which/whom the functional module is arranged, to a working region or to a room at least on the basis of the data transmitted between the functional module and the building infrastructure apparatus. The access control function can be used to monitor, for example, what room and/or region of a working area an individual and/or an object has/have access to and what work permit, in particular with respect to safety instructions, the individual has or must have. On account of the access control function, it is possible to detect, for example, entry to a region of a working area in which dangerous work can be carried out, and the access control function can be used to decide whether the individual has training sufficient for the risk and/or is wearing appropriate safety clothing. Simple access control can be advantageously enabled by means of the configuration according to the disclosure. In addition, the existence of training needed for a room or a region and/or safety clothing to be compulsorily worn can be advantageously monitored and access can be allowed on the basis of said existence or access can be prohibited in the case of the absence of said training and/or safety clothing and it is possible to output corresponding information which indicates the absence of said training and/or safety clothing and may constitute an instruction.

It is also proposed that the control and/or regulation unit is at least intended to actively intervene in control and/or regulation of an object, which is in the form of a portable machine tool and on which the functional module is arranged, by means of the functional module at least on the basis of the data transmitted between the functional module and the building infrastructure apparatus. If, for example, an item of information relating to the presence of a slippery surface in a region of a building or of premises at least partially surrounding the building can be transmitted from the building infrastructure apparatus to the functional module, a safety function of the portable machine tool, for example a kick-back function in an angle grinder, can be automatically activated or set, for example by means of communication between an object in the form of a portable machine tool and the functional module. It is also conceivable for a gas sensor element of the sensor unit of the functional module to detect the presence of a highly flammable gas during sparking machining of a workpiece, for example whereupon the portable machine tool can be automatically deactivated, for example, an output unit of the functional module and/or of the building infrastructure apparatus can be used to output a warning and/or the presence of the highly flammable gas in a region of the working area can be transmitted to the control and/or regulation unit in order to initiate corresponding countermeasures and/or to warn further individuals. It is advantageously possible to reliably avoid a hazard by means of the configuration according to the disclosure and an object and/or an individual can therefore be advantageously protected from damage or injury.

It is also proposed that the control and/or regulation unit has at least one monitoring function which is intended to monitor the presence of at least one item of prescribed safety clothing and/or a combination of items of prescribed safety clothing at least on the basis of the data transmitted between the functional module and the building infrastructure apparatus. The monitoring function is preferably intended to monitor a combination of items of safety clothing dictated by the working region and/or work assignment at least on the basis of safety and/or operating region rules. It is therefore advantageously possible to automatically monitor a requirement to wear items of safety clothing which is predefined by working region and/or safety rules, for example.

It is also proposed that the control and/or regulation unit has at least one output function which is intended to output at least one item of information by means of an output unit of the functional module and/or of the building infrastructure apparatus at least on the basis of the data transmitted between the functional module and the building infrastructure apparatus. In this case, the output unit may be in the form of a haptic, acoustic and/or optical output unit. The output unit preferably comprises at least one output element which is in the form of a display, a loudspeaker or the like. However, on account of the functional module being arranged on an object, it is also conceivable for the control and/or regulation unit to use an output unit of the object to output an item of information on the basis of the data transmitted between the functional module and the building infrastructure apparatus. An item of information can be advantageously output to an individual by means of the configuration according to the disclosure. An individual can therefore be advantageously warned of a hazardous situation, for example. In addition, it is likewise advantageously possible to warn other individuals in the environment of the individual of a hazardous situation, for example. Furthermore, the presence of a risk, for example, can be advantageously promptly transmitted to a central location on account of communication between the functional module and the building infrastructure apparatus. It is advantageously possible to centrally initiate measures for eliminating the risk.

It is also proposed that the control and/or regulation unit has at least one authorization function which is intended to predefine at least one authorization to use an object, on which the functional module is arranged, at least on the basis of the data transmitted between the functional module and the building infrastructure apparatus. The authorization function is preferably intended to predefine an authorization to use an object, on which the functional module is arranged, at least on the basis of a work instruction transmitted to the control and/or regulation unit, verified training of an individual which is checked by means of the control and/or regulation unit or the like. The configuration according to the disclosure can be used to advantageously ensure that an object, in particular a portable machine tool, can be safely used and/or operated by an individual. It is therefore possible to achieve a high degree of working safety which can be advantageously centrally monitored and/or logged.

It is also proposed that the control and/or regulation unit has at least one assignment function which is intended to at least assign at least one object, on which the functional module is arranged, to an individual at least on the basis of a common movement at least on the basis of the data transmitted between the functional module and the building infrastructure apparatus. A reliable assignment can be advantageously effected. In addition, it is advantageously possible to effect central management, monitoring and/or control on the basis of a reliable assignment of an object to an individual.

It is also proposed that the communication unit of the building infrastructure apparatus is intended to transmit electronic data to an external unit which differs from the functional module. The external unit may be, for example, in the form of a smartphone, a laptop, a PC, a tablet PC, a cloud, an emergency call center, a service center, a weather center, in particular a severe weather center, or the like, which is connected to the network, to which the building infrastructure apparatus is networked, by means of an access point of the network, in particular by means of a gateway. Data can be advantageously forwarded to and/or received from an external unit by means of the configuration according to the disclosure, which data can be used for control, management, use and/or control of a monitoring function and/or a protective function of an object and/or an individual inside the network.

At least one exemplary embodiment proposes that the mobile functional module is in the form of an autonomous locomotion device or is arranged on an autonomous locomotion device. In this case, an "autonomous locomotion device" is supposed to be understood as meaning, in particular, a device which automatically moves, is oriented or navigated in a region and/or in an environment, in particular automatically moves and/or is oriented in a region and/or in an environment according to a learning process. In this case, the expression "automatically move and/or are oriented" is supposed to define, in particular, a movement, orientation and/or navigation of the locomotion device, in particular according to a learning process, without human intervention. The autonomous locomotion device preferably automatically moves in a region and/or in an environment or is automatically oriented in a region and/or in an environment according to a learning process carried out by an operator with the autonomous locomotion device. The autonomous locomotion device is particularly preferably intended to move over a surface and, in particular, to treat the surface, for example sweep, vacuum or clean the surface. Various configurations of the autonomous locomotion device which appear to be useful to a person skilled in the art are conceivable, for example in the form of an autonomous sweeper, an autonomous vacuum cleaner, an autonomous forklift truck or the like. The autonomous locomotion device may have a chain drive, a wheel drive, a magnetic levitation drive, an air cushion drive or another drive which appears to be useful to a person skilled in the art.

It is conceivable for a treatment process of the autonomous locomotion device to be able to be controlled and/or regulated on the basis of communication between the mobile functional module, which is in the form of an autonomous locomotion device, in particular, or is arranged on an autonomous locomotion device, and the building infrastructure apparatus. For example, it is conceivable for a treatment process to be able to be controlled and/or regulated on the basis of the presence of employees in a building and/or on premises at least partially surrounding the building. For example, it is conceivable for an autonomous locomotion device in the form of an autonomous sweeper and/or an autonomous vacuum cleaner to begin, start or continue a cleaning process on the basis of the presence of employees in a building and/or on premises at least partially surrounding the building. Further control and/or regulation parameters are likewise conceivable, for example on the basis of weather data, communication between various autonomous locomotion devices or the like.

It is also conceivable for a monitoring function to be able to be implemented on the basis of communication between the mobile functional module, which is in the form of an autonomous locomotion device, in particular, or is arranged on an autonomous locomotion device, and the building infrastructure apparatus. For example, it is conceivable for an individual (human or animal) and/or an object who/which is in a region without authorization to be able to be detected/identified by the autonomous locomotion device. The autonomous locomotion device or the mobile functional module can derive what action needs to be carried out from a stored decision matrix or a head office (security service, manager or the like) is notified and decides what needs to be done and accordingly controls and/or regulates the autonomous locomotion device. The autonomous locomotion device can move toward an individual and/or an object in order to examine the latter more closely and/or to chase it/him away, for example (for example by means of at least one acoustic noise, by means of at least one visual signal, by means of a non-harmful defensive apparatus, in particular a water jet, an electric shock etc.) and/or to record an image of the individual and/or object. So that the individual and/or the object can be encountered and/or an image can be recorded of said individual and/or object, an infrared sensor unit, a motion sensor unit or the like of the autonomous locomotion device can be used to determine a position of the individual and/or the object.

It is also conceivable for the autonomous locomotion device to be able to be used for free, individual configuration of a building and/or of premises at least partially surrounding the building and/or to transport objects, in particular on the basis of communication between the mobile functional module, which is in the form of an autonomous locomotion device, in particular, or is arranged on an autonomous locomotion device, and the building infrastructure apparatus. For example, it is conceivable for the position at which an object is supposed to be arranged at which time to be able to be stored in a virtual building and/or premises plan. It is possible to transport decorative objects (vase, picture or the like), furniture (desk, chair or the like), goods, consumables or the like by means of the autonomous locomotion device on the basis of communication between the mobile functional module, which is in the form of an autonomous locomotion device, in particular, or is arranged on an autonomous locomotion device, and the building infrastructure apparatus. The configuration according to the disclosure makes it possible to advantageously expand the system, which can be used to facilitate work and/or to centrally manage, monitor and/or control individuals and/or objects.

A building infrastructure apparatus for a system according to the disclosure is also proposed. With regard to the compatibility of at least one component of the building infrastructure apparatus, the building infrastructure apparatus is preferably matched to the system according to the disclosure. The configuration according to the disclosure advantageously makes it possible to conveniently expand and/or retrofit already existing systems. A protective and/or monitoring function can therefore be advantageously implemented.

It is also proposed that the building infrastructure apparatus comprises at least one safety technology unit for recording and/or evaluating at least one safety characteristic variable. In this case, a "safety technology unit" is supposed to be understood as meaning, in particular, a unit which is intended to record, process and/or evaluate at least one characteristic variable for monitoring a building and/or premises at least partially surrounding the building with respect to a risk, an access authorization or the like. The safety technology unit may be, for example, in the form of a smoke concentration unit, a card reading unit, a light barrier unit, a camera unit, a motion detection unit, a proximity detection unit or the like. The configuration according to the disclosure can be advantageously used to record safety-relevant characteristic variables which can preferably be used to protect and/or monitor an object and/or an individual, in particular in connection with use of the recorded characteristic variables in a system according to the disclosure.

The safety technology unit advantageously has at least one sensor unit at least for recording at least one smoke characteristic variable, one movement characteristic variable, one approach characteristic variable, one heat characteristic variable and/or one access characteristic variable. The sensor unit may be, for example, in the form of a smoke sensor unit, in particular an optical smoke sensor unit, a motion sensor unit, an approach sensor unit, a heat sensor unit and/or an access sensor unit, for example a fingerprint sensor unit, a card reading sensor unit etc., or another sensor unit which appears to be useful to a person skilled in the art. It is conceivable, for example, for entry of an individual to a building and/or to premises at least partially surrounding the building to be able to be detected, for example by means of an approach sensor unit (infrared camera unit, motion sensor unit or the like). Alternatively or additionally, it is also conceivable for entry of an individual to a building and/or to premises at least partially surrounding the building to be able to be detected on the basis of communication between the mobile functional module and the building infrastructure apparatus. If an individual is known to the system, for example on account of an individual identifier which can be transmitted by means of the communication, a previously stored and/or individually adaptable procedure for receiving the individual can be carried out, for example. It is possible to store, for example, a profile of when the individual is supposed to be received and how. It is conceivable for the building infrastructure apparatus to output acoustic and/or optical greeting signals in order to receive the individual. For example, it is possible to activate lights which are arranged on an individual's commute on the basis of the individual and his commute and/or a time of day, for example in the case of different routes in a building and/or on premises at least partially surrounding the building. A brightness of the lights can be individually regulated and/or set. The configuration according to the disclosure advantageously makes it possible to record characteristic variables which define a health risk to an individual and/or impermissible access of an object and/or of an individual to a region, the recorded characteristic variables advantageously being able to be used to monitor, protect and/or manage an object and/or an individual, in particular in connection with a system according to the disclosure.

It is also proposed that the building infrastructure apparatus has at least one interface unit at least for connection to an expansion apparatus which comprises at least one communication unit for communicating electronic data with at least one external functional module. The interface unit is preferably intended to connect the expansion apparatus to the building infrastructure apparatus using data transmission technology. Alternatively or additionally, the interface unit is intended to connect the expansion apparatus to the building infrastructure apparatus in a form-fitting and/or force-fitting manner. The expansion apparatus can be at least partially integrated in the building infrastructure apparatus by means of the interface unit or may be removably arranged on the building infrastructure apparatus. The expansion apparatus is preferably intended at least to communicate with the functional module and/or the network, to which the building infrastructure apparatus is networked. The expansion apparatus is preferably intended to store and/or transmit electronic data. The electronic data which can be stored and/or transmitted may be, for example, specific room/location data, in particular a position, a location in a building with a statement of the building, floor and room or a name/designation of a room/region in which the building infrastructure apparatus is arranged, or other data which appear to be useful to a person skilled in the art. In addition, the electronic data which can be stored and/or transmitted may be, for example, safety-relevant information relating to a room/region, similar to a warning sign, be provided, for example risk of an explosion, warning of laser etc., or working region and/or safety rules which apply to a region covered by the building infrastructure apparatus, safety-related attributes and information relating to regions, for example explosion protection, working only with dead man monitoring, noise-related attributes for regions, for example all types of work, the noise emission of which is above a defined threshold value, for example drilling, chiseling etc., can be carried out only in a stipulated time window, or other data which appear to be useful to a person skilled in the art. The configuration according to the disclosure advantageously enables retrofitting, in particular. In addition, use-specific expansion of the functions of the building infrastructure apparatus can be advantageously achieved.

It is also proposed that the interface unit is intended for a releasable connection to the expansion apparatus. The interface unit comprises at least one interface element for connecting the expansion apparatus to the building infrastructure apparatus. The interface element may be in the form of a latching element, a clip element, a spring contact element, a connector and/or socket element, for example a USB connector, a USB socket, an SD card slot, a LAN connector, a LAN socket etc., or another interface element which appears to be useful to a person skilled in the art and is intended to connect the expansion apparatus to the building infrastructure apparatus in a form-fitting and/or force-fitting manner and/or is intended to connect the expansion apparatus to the building infrastructure apparatus using data transmission technology. The configuration according to the disclosure advantageously makes it possible to achieve a configuration of the building infrastructure apparatus with an expansion apparatus corresponding to an intended purpose. In addition, it is advantageously possible to remove the expansion apparatus from the building infrastructure apparatus for maintenance and/or service purposes.

The building infrastructure apparatus advantageously comprises at least one energy interface which is intended to wirelessly receive and/or output electrical energy. The energy interface is preferably in the form of an inductive energy interface. However, it is also conceivable for the energy interface to have another configuration which appears to be useful to a person skilled in the art. The configuration according to the disclosure advantageously enables a convenient charging function of the building infrastructure apparatus and/or of a portable machine tool arranged in the vicinity of the building infrastructure apparatus.

A method at least for locating and/or monitoring at least one object and/or at least one individual by means of a system according to the disclosure is also proposed. An object and/or at least one individual is/are preferably located at least on the basis of an evaluation of communication between the functional module and the building infrastructure apparatus by means of the control and/or regulation unit. In order to locate at least one object and/or at least one individual, at least one functional module of the system is preferably arranged on the object and/or at least one further functional module of the system is arranged on the individual, for example on a bracelet, on a watch or the like worn by the individual on his body. The configuration according to the disclosure advantageously makes it possible to reliably locate an object and/or an individual, in particular to reliably locate an object and/or an individual inside a building or inside premises which at least partially surround the building and are shielded, at least to the greatest possible extent, from reception and/or transmission of data from a global location determination apparatus, for example a GPS apparatus.

It is also proposed that, in at least one method step, at least one object, on which the functional module is arranged, is assigned to an individual in an at least partially automatic manner at least on the basis of a common movement of the object and of the individual. At least one further functional module of the system is preferably arranged on the individual. A movement of the object and of the individual is preferably recorded over a predetermined period, in particular a predetermined period of less than 10 hours, preferably less than 60 minutes and particularly preferably less than 30 minutes. An at least substantially unique assignment of the object to the individual can preferably be achieved on the basis of an evaluation of the common movement. The configuration according to the disclosure advantageously reliably enables an assignment, in which case monitoring, management and/or control, for example access control to regions, of the object and of the individual can be carried out in a particularly advantageous manner on the basis of the assignment. For example, as a result of an object, in particular a portable machine tool or an item of safety clothing, being assigned to an individual, in particular an operator of the portable machine tool, performance of work, for which the individual does not have any training or which requires the presence of predefined safety clothing, can be controlled, in particular can be allowed or prevented, for example by intervening in a control unit of the portable machine tool or by denying access to a region etc., on the basis of an assignment of the object to the individual. At least one individual and at least one object carried by the individual, for example, can be advantageously identified as an associated cluster via a common movement profile by means of the method according to the disclosure. Authorizations can be advantageously allocated to this cluster by the control and/or regulation unit. A cluster can be advantageously identified in an at least partially automatic manner using the system according to the disclosure and authorization management can therefore be carried out. If, for example, a particular task, for which particular objects are required, is allocated to an individual, it is advantageously possible to check whether the individual carries all objects relevant to carrying out the task. If necessary, the individual's attention can be advantageously drawn to the fact that a particular object is not carried, for example, by means of the output unit of the functional module and/or the output unit of the building infrastructure apparatus.

It is also proposed that, in at least one method step, a movement history is used to assign at least one object, on which the functional module is arranged, to an individual. A movement history describing a movement of the object and/or of the individual over a previously elapsed part of an entire working day can be used, for example. A movement of the object and/or of the individual in the past can be advantageously used for an assignment. The method according to the disclosure can preferably adjust to changes. If, for example, at least one object, in particular a portable machine tool, is handed over, a handover can be identified on account of an evaluation of the movement history of the object and a new assignment can be carried out. If an assignment is not unique, it is also conceivable for further characteristic variables to be taken into account in an assignment. For example, work boots are worn, to the greatest possible extent, by a single individual over an entire lifespan, but protective glasses can also be worn by different individuals. The work boots can therefore preferably be assigned to a particular individual. It is also conceivable for the method to operate with intelligent assumptions if the assignment is not unique. The configuration according to the disclosure advantageously enables a reliable and accurate assignment, in particular when monitoring different objects and/or individuals which/who move together at least temporarily. In addition, it is advantageously possible to carry out a plausibility check in order to enable a particularly reliable assignment.

It is also proposed that, in at least one method step, an access authorization for a working region or for a room and/or a work authorization for using the object is/are given at least on the basis of an assignment of at least one object to at least one individual. The configuration according to the disclosure advantageously makes it possible to comply with work safety rules and/or an access authorization.

It is also proposed that, in at least one method step, information is output by means of an output unit on the basis of an assignment of at least one object to at least one individual. For example, it is conceivable for entry of an individual to a building and/or to premises at least partially surrounding the building to be able to be detected, for example by means of an approach sensor unit (infrared camera unit, a motion sensor unit or the like). Alternatively or additionally, it is also conceivable for entry of an individual to a building and/or to premises at least partially surrounding the building to be able to be detected on the basis of communication between the mobile functional module and the building infrastructure apparatus. If an individual is known to the system, for example on account of an individual identifier which can be transmitted by means of the communication, a previously stored and/or individually adaptable procedure for receiving the individual can be carried out, for example. A profile of when the individual is supposed to be received and how can be stored, for example. It is conceivable for the building infrastructure apparatus to output acoustic and/or optical greeting signals in order to receive the individual. For example, it is possible to activate lights which are arranged on an individual's commute on the basis of the individual and his commute and/or a time of day, in the case of different routes in a building and/or on premises at least partially surrounding the building. A brightness of the lights can be individually regulated and/or set. The configuration according to the disclosure advantageously makes it possible to output instructions which are carried out on the basis of the assignment. It is advantageously possible to output an item of information in order to individually and conveniently inform an individual of events. In addition, it is advantageously possible to prevent, to the greatest possible extent, misinterpretation of restrictions, for example an access restriction or a work restriction. In addition, it is advantageously possible to initiate an action of the individual in order to eliminate the restriction since an instruction to eliminate the restriction can be given by outputting information.

In this case, the system according to the disclosure, the building infrastructure apparatus according to the disclosure and/or the method according to the disclosure is/are not supposed to be restricted to the use and embodiment described above. In particular, the system according to the disclosure, the building infrastructure apparatus according to the disclosure and/or the method according to the disclosure may have a number differing from a number of individual elements, components and units as well as method steps mentioned herein in order to carry out a method of operation described herein. In addition, in the case of the ranges of values stated in this disclosure, values within the limits mentioned should also be considered as disclosed and arbitrarily usable.

BRIEF DESCRIPTION OF THE DRAWINGS

Further advantages emerge from the following description of the drawing. The drawing illustrates an exemplary embodiment of the disclosure. The drawing and the description contain numerous features in combination. A person skilled in the art will also expediently consider the features individually and will combine them to form useful further combinations.

In the drawing.

DETAILED DESCRIPTION

Figure 1:
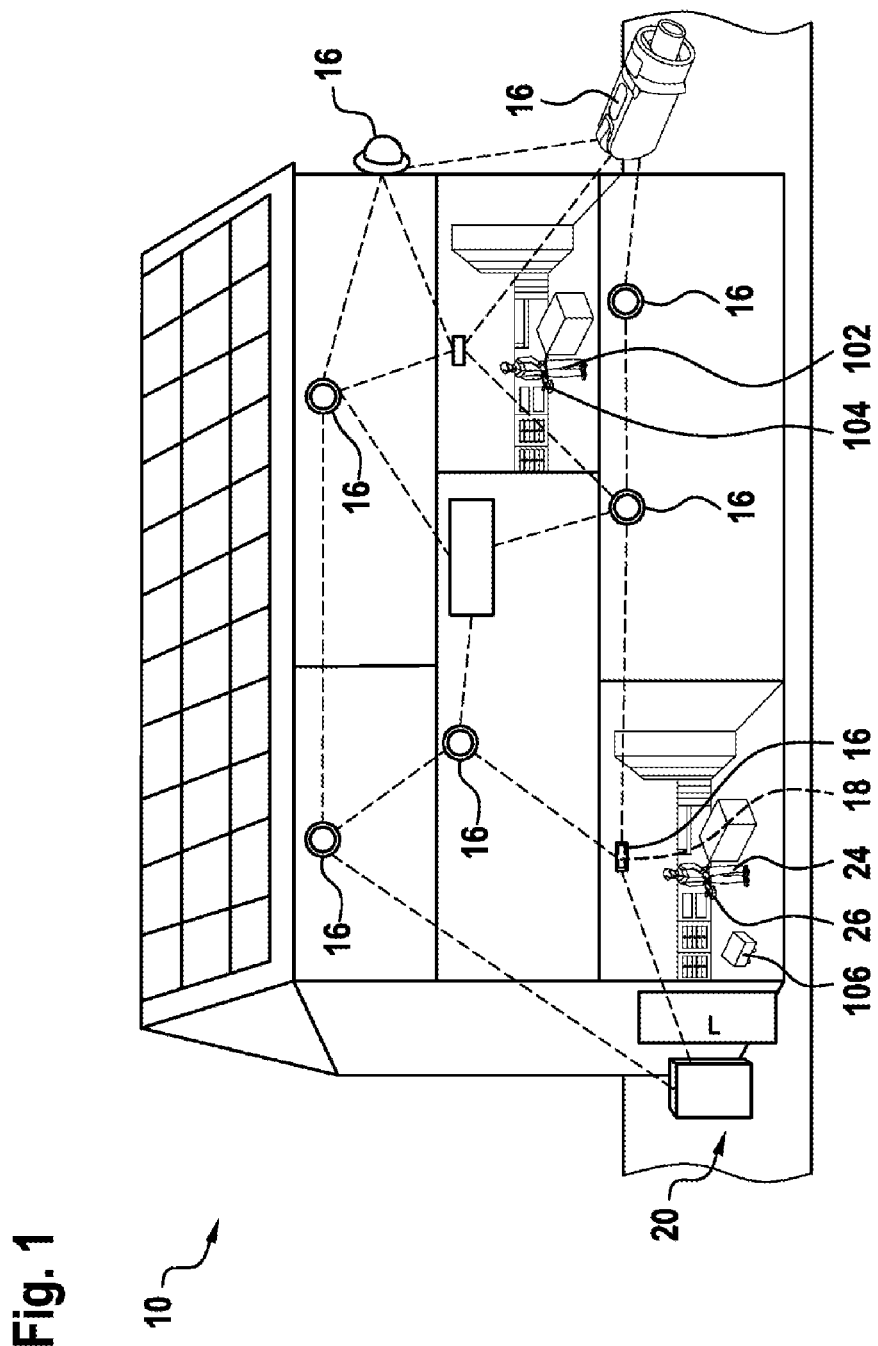
FIG. 1 shows a schematic illustration of a system according to the disclosure having at least one mobile functional module and having at least one building infrastructure apparatus according to the disclosure at least for communicating with the functional module.

FIG. 1 shows a system 10 for networking at least one object 26 and/or at least one individual 24 to one another and/or to a network, in particular for networking at least one object 26 and/or at least one individual 24 to a network of a building security system and/or a building fire detection system. The system 10 is intended to monitor, manage, protect and/or control the at least one object 26 and/or the at least one individual 24. The system 10 is in the form of a portable power tool system which is intended to network at least one object 26, which can be used when machining a workpiece and/or can be used to protect an individual 24, to at least the network of the building security system and/or of the building fire detection system. In addition, the system 10 in the form of a portable power tool system is intended to network the at least one individual 24 to the at least one object 26 and/or to at least the network of the building security system and/or of the building fire detection system. However, it is also conceivable for the system 10 to be in the form of another system which appears to be useful to a person skilled in the art and is intended to network at least one object 26 and/or at least one individual 24 to one another and/or to a superordinate network of another area of influence, for example in the form of a system for the public sector, a system for care homes, a system for childcare facilities, a system for education facilities, a system for hospitals, a system for department stores or the like.

The system 10 comprises at least one mobile functional module 12 which has at least one communication unit 14 for communicating electronic data, at least one building infrastructure apparatus 16 which has at least one communication unit 18 for communicating with the functional module 12, and at least one control and/or regulation unit 20 which is at least intended to infer at least a position of the functional module 12, in particular a position of the functional module 12 inside a region monitored by means of the system 10, on the basis of an evaluation of communication between the functional module 12 and the building infrastructure apparatus 16. The functional module 12 is at least intended to record at least one object-specific characteristic variable, one operator-specific characteristic variable and/or one environment-specific characteristic variable and/or to transmit it/them at least to the building infrastructure apparatus 16, in particular by means of the communication unit 14 of the functional module 12. The functional module 12 is at least intended to record at least one object-specific characteristic variable, one operator-specific characteristic variable and/or one environment-specific characteristic variable of the at least one object 26 and/or of the at least one individual 24, on which/whom the functional module 12 is arranged. The functional module 12 can be releasably arranged on the object 26, can be releasably arranged on an autonomous locomotion device 106 or can be releasably arranged on the individual 24. However, it is also conceivable for the functional module 12 to be unreleasably arranged on the object 26, the autonomous locomotion device 106 or the individual 24, in particular to be integrated in the object 26, the autonomous locomotion device 106 or the individual 24. The system 10 preferably comprises a multiplicity of building infrastructure apparatuses 16 which are connected to the network of the building security system and/or of the building fire detection system. The system 10 preferably comprises a multiplicity of functional modules 12 which can be arranged on a multiplicity of different or identical objects 26 and/or on a multiplicity of individuals 24. The functional modules 12 can be variably arranged on different objects and/or on different individuals 24. However, it is also conceivable for the functional modules 12 to be able to be arranged, according to a fixed assignment to a single object 26 and/or to a single individual 24 in each case, on the respectively assigned object 26 and/or the respectively assigned individual 24. A fixed assignment of the functional modules 12 can be freely programmable. The functional modules 12 of the system 10 have an at least substantially similar configuration, with the result that a description of a single functional module 12 can be applied to the further functional modules 12 of the system 10 below.

Figure 3:
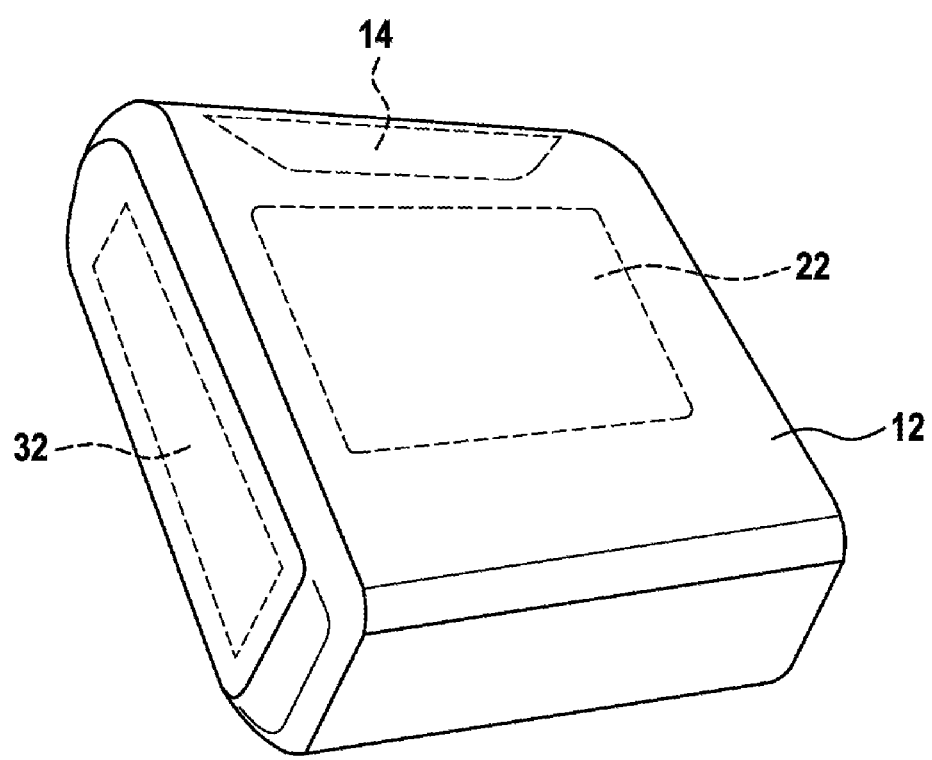
FIG. 3 shows a schematic illustration of a networking diagram of the system according to the disclosure with various external units.

The functional module 12 has at least one sensor unit 22 which is intended to record at least one object-specific characteristic variable, one operator-specific characteristic variable and/or one environment-specific characteristic variable in an at least partially automatic manner (FIG. 3). The sensor unit 22 may have a multiplicity of sensor elements which are intended to record at least one object-specific characteristic variable, one operator-specific characteristic variable and/or one environment-specific characteristic variable in an at least partially automatic manner. In particular, a combination of a wide variety of sensor elements which are intended to record different object-specific characteristic variables, operator-specific characteristic variables and/or environment-specific characteristic variables is conceivable. For example, the sensor unit 22 comprises at least one object characteristic variable sensor element, one environment characteristic variable sensor element and/or one operator characteristic variable sensor element (not illustrated in any more detail here). In this case, the object characteristic variable sensor element, the environment characteristic variable sensor element and/or the operator characteristic variable sensor element may have any configuration(s) which appear(s) to be useful to a person skilled in the art, for example a configuration as a safety clothing item burden type sensor, a wearer burden sensor (noise burden sensor, vibration burden sensor or the like), a pulse sensor, a body temperature sensor, a fatigue sensor, a wearer orientation sensor, a motion sensor, an ambient pressure sensor, an ambient temperature sensor, an ambient sound level sensor, an ambient gas sensor, an ambient voltage sensor, an ambient moisture sensor, an ambient acid and/or ambient base sensor, an object state sensor, an object type sensor or the like. The characteristic variable(s) recorded by means of the sensor unit 22 can be transmitted to the building infrastructure apparatus 16 by means of the communication unit 14 of the functional module 12. The characteristic variable(s) transmitted to the building infrastructure apparatus 16 can be evaluated and processed further by means of the control and/or regulation unit 20. The control and/or regulation unit 20 may be part of the building infrastructure apparatus 16, in particular may be arranged on the building infrastructure apparatus 16. The control and/or regulation unit 20 may be in the form of a central computing unit which, in addition to evaluating and further processing the transmitted characteristic variable(s), is intended to control and/or regulate the network of the building security system and/or of the building fire detection system. However, it is also conceivable for the control and/or regulation unit 20 to be arranged on the functional module 12 and for recorded characteristic variables from the sensor unit 22 to be evaluated and processed further irrespective of forwarding to the building infrastructure apparatus 16. Further configurations and/or arrangements of the control and/or regulation unit 20 which appear to be useful to a person skilled in the art are likewise conceivable, for example a configuration of the control and/or regulation unit 20 as a company mainframe computer which is intended to process at least a multiplicity of data arising in a company, or the like.

Figure 6:
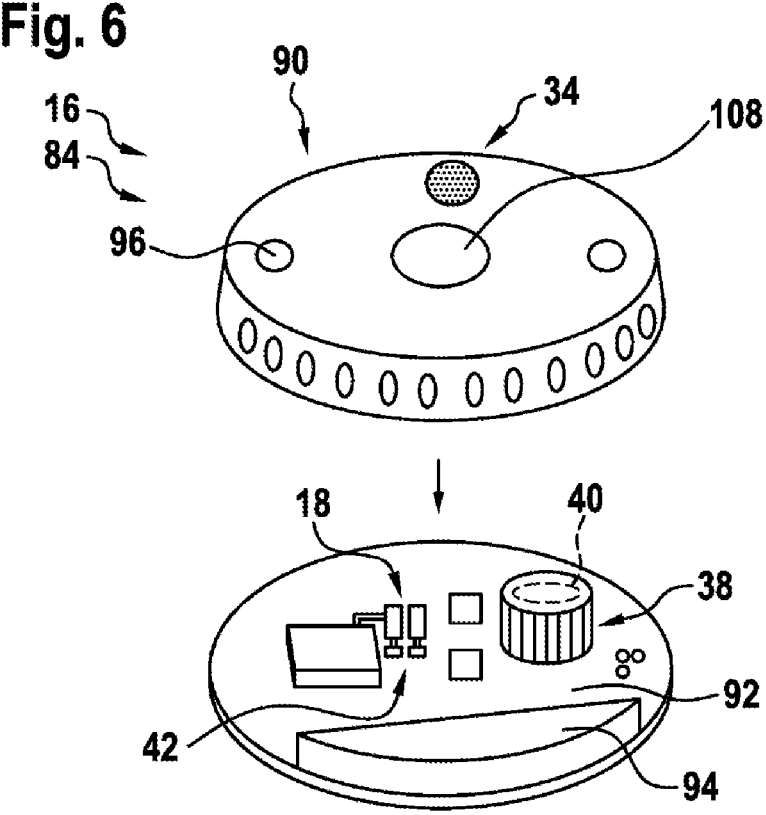
FIG. 6 shows a schematic illustration of a detailed view of a configuration of the building infrastructure apparatus according to the disclosure in the form of a fire and/or smoke detector.

The control and/or regulation unit 20 has at least one evaluation function which is at least intended to infer a vital state of an individual 24, a burden on an individual 24 and/or a potential risk to an individual 24 at least on the basis of the data transmitted between the functional module 12 and the building infrastructure apparatus 16. It is conceivable for a noise level to be able to be recorded, for example by means of a sensor element, in particular a noise sensor element, of the sensor unit 22 of the functional module 12. This noise level can be evaluated, for example, by means of the control and/or regulation unit 20, in particular as a result of the noise level being transmitted to the control and/or regulation unit 20 by means of communication between the functional module 12 and the building infrastructure apparatus 16. If it can be determined by means of the evaluation function that a noise level limit value is exceeded, a corresponding item of information, in particular a warning signal and/or a warning symbol, for example, can be output by means of an output unit 32 of the functional module 12 (FIG. 3) and/or by means of an output unit 34 of the building infrastructure apparatus 16 (FIG. 6). It is also conceivable for further characteristic variables which appear to be useful to a person skilled in the art to be able to be recorded by means of the sensor unit 22 of the functional module 12, which characteristic variables can be evaluated by means of the evaluation function of the control and/or regulation unit 20, and for corresponding information to be able to be output by means of the output unit 32 of the functional module 12 and/or by means of the output unit 34 of the building infrastructure apparatus 16. For example, an ambient brightness, a status of a state of an item of safety clothing 30, the presence of radioactivity, an acid, a gas, dust pollution etc., an ambient temperature, a surface state, application of an electrical voltage, overloading of a wearer of the object 26 in the form of an item of safety clothing 30 (FIG. 4), for example as a result of poor posture, by lifting an excessively high load or the like, a number of steps, a weight of a wearer of the item of safety clothing 30, a daily output of a wearer of the item of safety clothing 30, calories consumed or the like can be recorded by means of the sensor unit 22 of the functional module 12.

The control and/or regulation unit 20 also has at least one access control function which is at least intended to monitor, enable or block access to a working region or to a room by the object 26 and/or the individual 24, on which/whom at least one functional module 12 is arranged, at least on the basis of the data transmitted between the functional module 12 and the building infrastructure apparatus 16. The access control function is intended, for example, to monitor, enable or block access, to check at least a training status of the individual 24, at least the presence of a combination of items of safety clothing 30 required for access, a state of individual parts of a combination of items of safety clothing 30 required for access or further specifications which appear to be useful to a person skilled in the art and are made available to the control and/or regulation unit 20 as a result of data being transmitted between the functional module 12 and the building infrastructure apparatus 16.

The control and/or regulation unit 20 is also at least intended to actively intervene in control and/or regulation of an object 26, which is in the form of a portable machine tool 28 (FIG. 4) and on which the functional module 12 is arranged, by means of the functional module 12 at least on the basis of the data transmitted between the functional module 12 and the building infrastructure apparatus 16. The functional module 12 has a control interface (not illustrated in any more detail here) which makes it possible to influence control and/or regulation of the object 26 at least in a state in which the functional module 12 is arranged on the object 26. The control interface can be connected, using data transmission technology, to an electronic unit (not illustrated in any more detail here) of the object in the form of a portable machine tool 28. For example, if an inadequate training status of an individual 24 is identified, the control and/or regulation unit 20 can be used to prevent activatability of the object 26 in the form of a portable machine tool 28 in order to avoid possible incorrect operation of the object 26 and/or possible injury of the individual 24. The training status of the individual 24 can be stored in a central database which can be accessed by the control and/or regulation unit 20. Furthermore, the training status of the individual 24 can be transmitted to the control and/or regulation unit 20 by means of an external unit 36 or can be retrieved on account of a training status characteristic variable being read in by means of the sensor unit 22 of the functional module 12, for example by means of a sensor element of the sensor unit 22 of the functional module 12 in the form of an ID card reading element. In addition, further actions, for example setting of safety functions of the object 26 in the form of a portable machine tool 28, setting of machine tool characteristic variables for optimum machining of a workpiece or the like, can be carried out by means of the control and/or regulation unit 20, which actions are dependent on the data transmitted between the functional module 12 and the building infrastructure apparatus 16. The data which can be transmitted between the functional module 12 and the building infrastructure apparatus 16 may be data based on characteristic variables which were recorded by means of the sensor unit 22 of the functional module 12, are stored in a central database on account of risk analyses of working regions, are stored in an object-specific, operator-specific and/or environment-specific manner in a memory unit (not illustrated here) of the functional module 12 and/or of the control and/or regulation unit 20 by means of a manual input or the like.

The control and/or regulation unit 20 also has at least one monitoring function which is intended to monitor the presence of at least one prescribed item of safety clothing 30 and/or a combination of prescribed items of safety clothing 30 at least on the basis of the data transmitted between the functional module 12 and the building infrastructure apparatus 16. It is conceivable, for example, for the presence of at least one prescribed item of safety clothing 30 and/or a combination of prescribed items of safety clothing 30 to be able to be monitored when a working region is entered as a result of at least one item of safety clothing 30, on which at least the functional module 12 is arranged, being assigned to an individual 24, who can be identified as the wearer of the item of safety clothing 30 by means of the sensor unit 22 of the functional module 12, and on account of a comparison of working region and/or safety rules which are stored in a memory unit of the control and/or regulation unit 20, entry to the working region being able to be detected on account of communication between the functional module 12 and the building infrastructure apparatus 16 arranged in the working region. It is also conceivable, for example, for the individual 24 to wear a functional module 12 directly on his body, for example a functional module 12 integrated in a wristwatch 60 or the like, and for a further functional module (not illustrated in any more detail here) of the system 10 to be arranged on the item of safety clothing 30 worn by the individual 24. The item of safety clothing 30 is assigned to the individual 24 on account of a common movement of the individual 24 and the item of safety clothing 30. If a working region is entered on account of communication between the functional module 12 and the building infrastructure apparatus 16 arranged in the working region, an item of safety clothing prescribed for the working region and an item of safety clothing 30 actually worn by the individual 24 are compared by means of the monitoring function of the control and/or regulation unit 20. Further configurations which appear to be useful to a person skilled in the art for implementing the monitoring function of the control and/or regulation unit 20 are likewise conceivable. The control and/or regulation unit also has at least one assignment function which is intended to at least assign at least one object 26, on which the functional module 12 is arranged, to an individual 24 at least on the basis of a common movement at least on the basis of the data transmitted between the functional module 12 and the building infrastructure apparatus 16.

The control and/or regulation unit 20 also has at least one output function which is intended to output at least one item of information by means of the output unit 32 of the functional module 12 (FIG. 3) and/or by means of the output unit 34 of the building infrastructure apparatus 16 (FIG. 6) at least on the basis of the data transmitted between the functional module 12 and the building infrastructure apparatus 16. If, for example, the absence of at least one item of safety clothing 30 prescribed for a working region and/or for carrying out a work activity is detected by means of the monitoring function of the control and/or regulation unit 20, an acoustic, optical and/or haptic notice which makes an individual 24 aware of the absence can be output by means of the output unit 32 of the functional module 12 and/or by means of the output unit 34 of the building infrastructure apparatus 16. In addition, further information which appears to be useful to a person skilled in the art, for example the presence of a harmful gas concentration in a working region, which can be detected by means of the sensor unit 22 of the functional module 12 in particular, can be output by means of the output unit 32 of the functional module 12 and/or the output unit 34 of the building infrastructure apparatus 16. On account of communication with the building infrastructure apparatus 16, the information can be forwarded to further components of the system 10 in order to output warnings to further locations and/or to initiate measures for eliminating the risk, in particular measures which can be initiated by the control and/or regulation unit 20.

The control and/or regulation unit 20 also has at least one authorization function which is intended to predefine at least one authorization to use an object 26, on which the functional module 12 is arranged, at least on the basis of the data transmitted between the functional module 12 and the building infrastructure apparatus 16. It is conceivable, for example, for an additional qualification to be needed to use an object 26. If an individual 24 does not have this additional qualification or the presence of this additional qualification of the individual 24 is not stored, in particular is not stored in a central database to which the control and/or regulation unit 20 has access, use of the object 26 is prohibited, in which case activation of the object 26, in particular, can be prevented by the control and/or regulation unit 20 on account of communication between the functional module 12, which is arranged on the object 26, and the building infrastructure apparatus 16, in particular until the presence of the necessary additional qualification has been verified.

Figure 2:
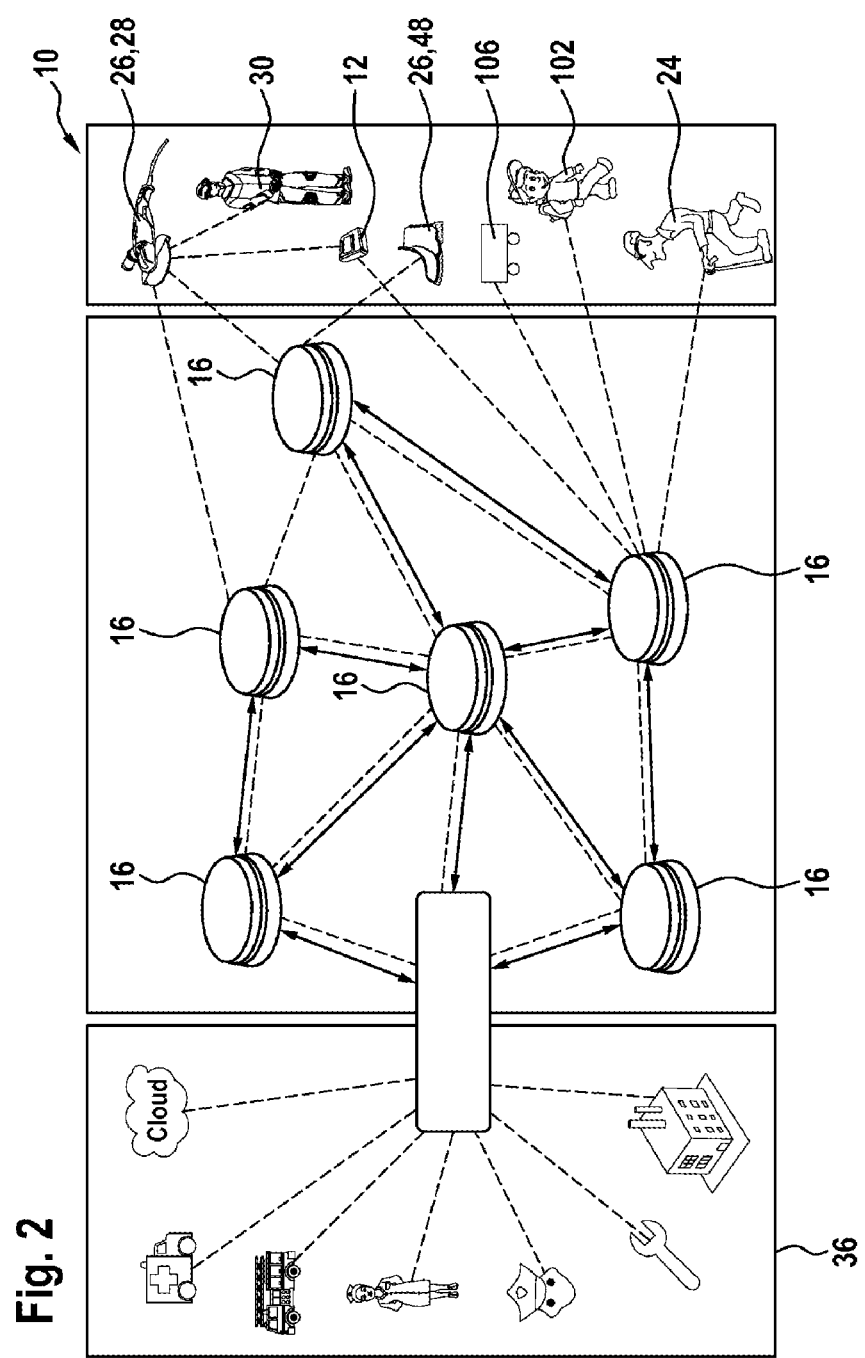
FIG. 2 shows a schematic illustration of a detailed view of the functional module of the system according to the disclosure.

The communication unit 18 of the building infrastructure apparatus 16 is also intended to transmit electronic data to an external unit 36 which differs from the functional module 12 (FIG. 2). The communication unit 18 of the building infrastructure apparatus 16 can be used, for example, to transmit electronic data to the external unit 36, which electronic data can be acquired by the sensor unit 22 of the functional module 12. The communication unit 18 of the building infrastructure apparatus 16 can also be used, for example, to transmit electronic data to the functional module 12 and/or to the control and/or regulation unit 20, which data are provided by the external unit 36. FIG. 2 illustrates various external units 36, for example an external rescue unit, an external service unit, an external security unit, an external production facility or the like. The exemplary embodiments of the external unit 36 which are illustrated in FIG. 2 are not supposed to be understood in this case as being conclusive for possible configurations of the external unit 36, but rather as examples of a multiplicity of possible configurations of the external unit 36. The external unit 36 may also be, for example, in the form of a mobile telephone, in particular a smartphone, belonging to the individual 24 or in the form of a portable data processing unit, for example a laptop, a tablet PC etc., or in the form of another external unit 36 which appears to be useful to a person skilled in the art.

Figure 4:
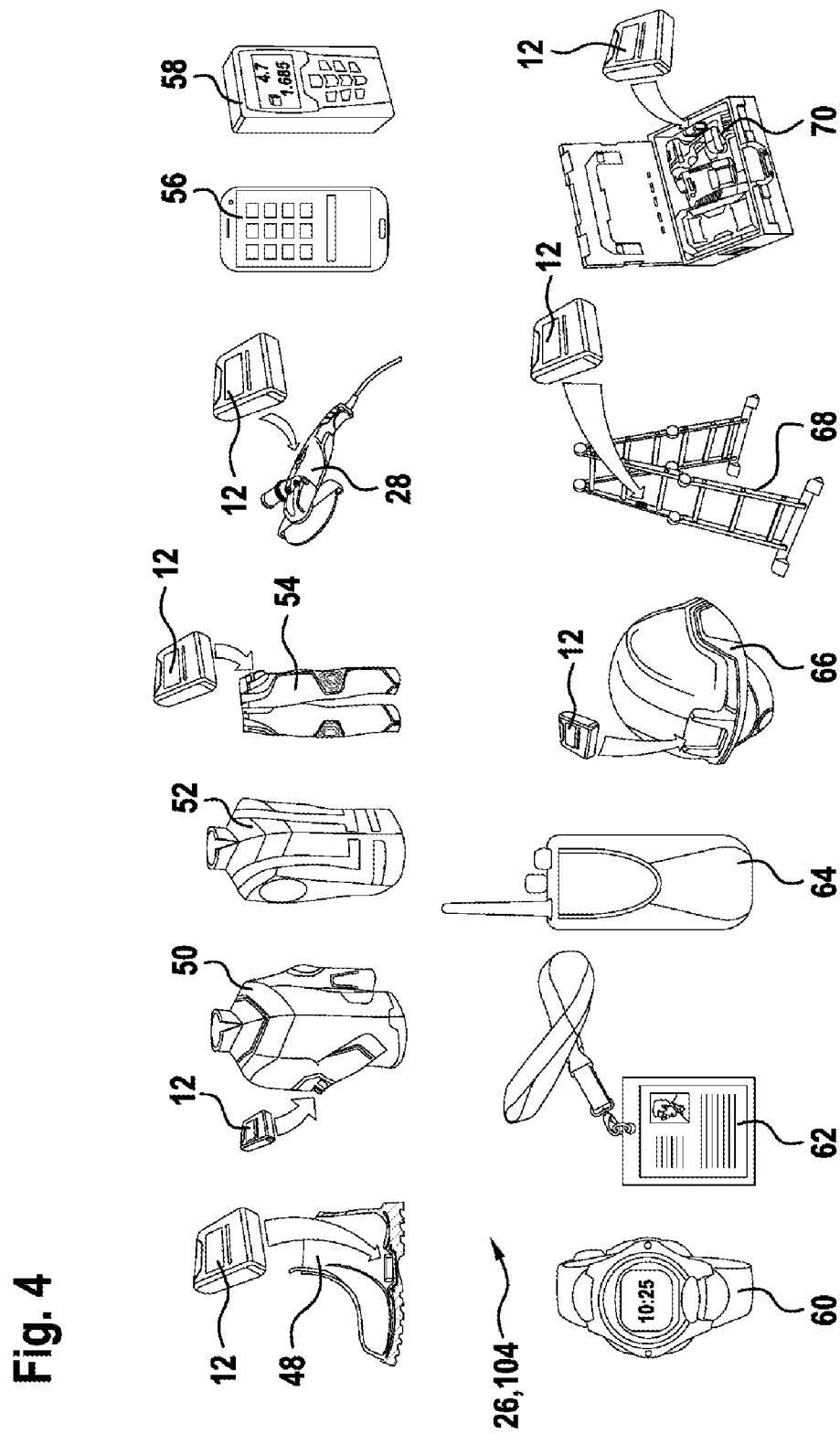
FIG. 4 shows a schematic illustration of various objects, on which the functional module may be arranged, or which constitute an external unit with which the building infrastructure apparatus can communicate.

FIG. 4 shows possible configuration variants of the object 26, on which the functional module 12 of the system 10 can be arranged or into which the functional module 12 can be integrated. The possible configuration variants of the object 26 which are illustrated in FIG. 4 are not supposed to be understood in this case as being conclusive for possible configurations of the object 26, but rather as examples of a multiplicity of possible configurations of the object 26. The object 26 may be in the form of an item of safety clothing 30 (a work boot 48, a safety jacket 50, a safety vest 52, safety trousers 54, a safety helmet 66 or the like), a portable machine tool 28 (angle grinder, drilling machine, grinding machine, planing machine or the like), a portable data processing unit 56 (smartphone, laptop, tablet PC or the like), an electronic measuring device 58, a wristwatch 60, an ID card 62 (access authorization card, identifications, time card or the like), a radio device 64, an item of work equipment 68 (ladder, movable workbench or the like), a storage apparatus 70 (tool case, toolbox or the like) or another object which appears to be useful to a person skilled in the art.

Figure 5:
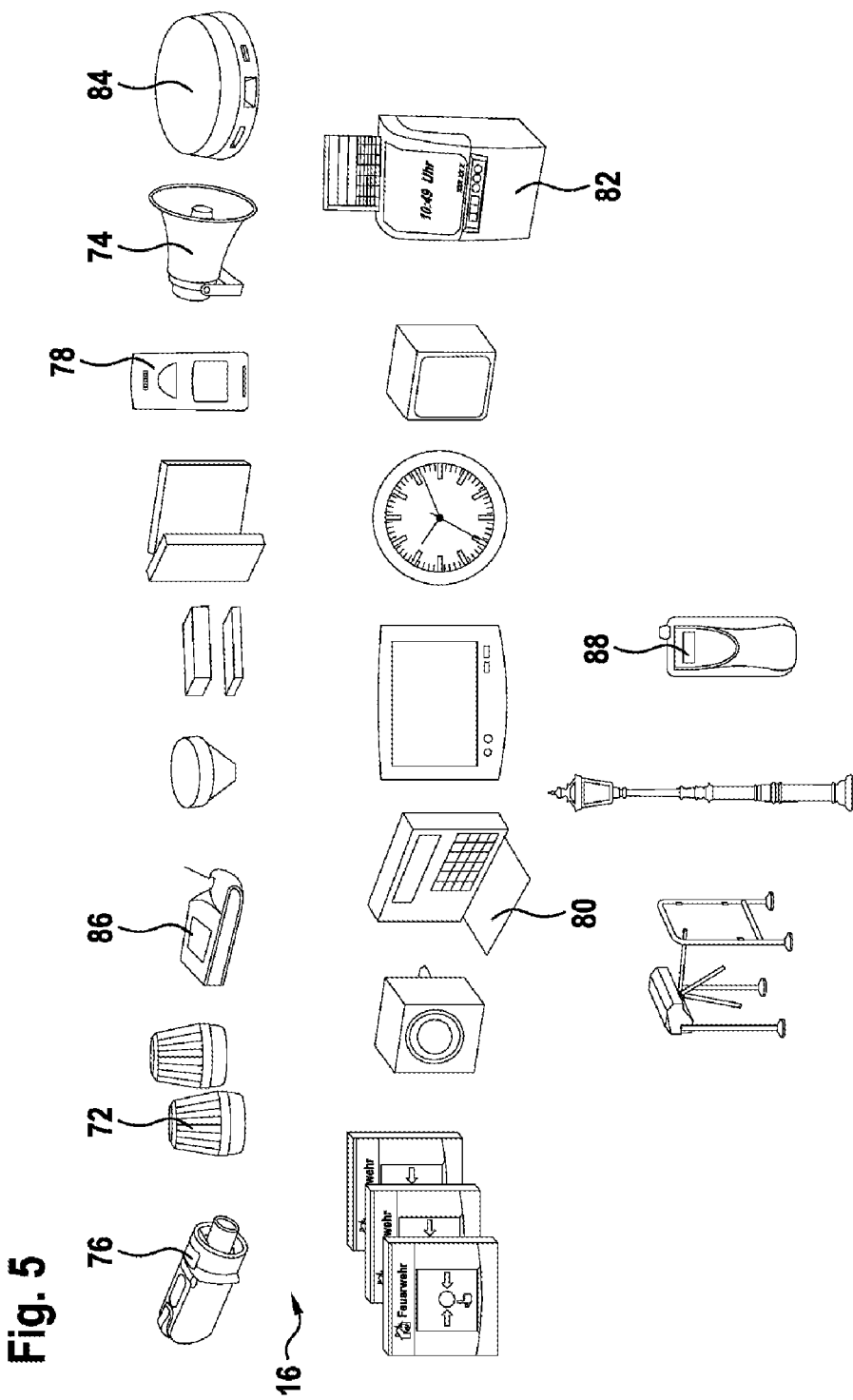
FIG. 5 shows a schematic illustration of various configuration variants of the building infrastructure apparatus according to the disclosure.

FIG. 5 shows possible configuration variants of the building infrastructure apparatus 16 of the system 10. The possible configuration variants of the building infrastructure apparatus 16 which are illustrated in FIG. 5 are not supposed to be understood here as conclusive for possible configurations of the building infrastructure apparatus 16, but rather as examples of a multiplicity of possible configurations of the building infrastructure apparatus 16. The building infrastructure apparatus 16 may be in the form of an optical signal generator 72 (signal lamp or the like), an acoustic signal generator 74 (loudspeaker, signal horn or the like), a camera 76, a motion detector 78, an access control apparatus 80 (door locking apparatus, code input apparatus, status display apparatus or the like), a time recording apparatus 82 (clock, code input apparatus, status display apparatus or the like), a fire and/or smoke detector 84, a communication apparatus 86 (telephone apparatus, hands-free apparatus, door intercom apparatus or the like), a radio transmission apparatus 88 or another building infrastructure apparatus which appears to be useful to a person skilled in the art.

FIG. 6 shows a detailed view of an exemplary embodiment of the building infrastructure apparatus 16 in the form of a fire and/or smoke detector 84. The building infrastructure apparatus 16 comprises at least one safety technology unit 38 for recording and/or evaluating at least one safety characteristic variable. The safety technology unit 38 has at least one sensor unit 40 at least for recording at least one smoke characteristic variable, one movement characteristic variable, one approach characteristic variable, one heat characteristic variable and/or one access characteristic variable. If the building infrastructure apparatus 16 is in the form of a fire and/or smoke detector 84, the safety technology unit 38 has at least one sensor unit 40 at least for recording at least one smoke characteristic variable. However, it is conceivable for the building infrastructure apparatus 16 in the form of a fire and/or smoke detector 84 to additionally comprise at least one further sensor unit which is at least intended to record a movement characteristic variable, an approach characteristic variable, a heat characteristic variable and/or an access characteristic variable. The sensor unit 40 is at least partially arranged in a housing unit 90 of the building infrastructure apparatus 16. The housing unit 90 of the building infrastructure apparatus 16 in the form of a fire and/or smoke detector 84 has a configuration which is already known to a person skilled in the art.

The building infrastructure apparatus 16 also comprises at least one interface unit 42 at least for connection to an expansion apparatus 44 which comprises at least the communication unit 18 of the building infrastructure apparatus 16 for communicating electronic data with at least the external functional module 12. The interface unit 42 is in the form of a printed circuit board interface which is intended to connect the expansion apparatus 44 to a motherboard 92 of the building infrastructure apparatus 16, at least using data transmission technology. The expansion apparatus 44 is also connected to the building infrastructure apparatus 16, in particular to the motherboard 92 of the building infrastructure apparatus 16, in a form-fitting and/or force-fitting manner by means of the interface unit 42.

The motherboard 92 is arranged in the housing unit 90 in a manner known to a person skilled in the art.

In order to supply energy, in particular in an emergency, for example a power failure, the building infrastructure apparatus 16 has an energy storage unit 94 which is in the form of a rechargeable battery unit, in particular. The building infrastructure apparatus 16 also has an emergency lighting unit 96. The emergency lighting unit 96 can be supplied with energy by means of the energy storage unit 94 or the emergency lighting unit 96 comprises an additional energy storage unit for supplying energy in the event of a power failure. The building infrastructure apparatus 16 comprises at least one energy interface 108 which is intended to wirelessly receive and/or output electrical energy. The energy interface 108 is intended to wirelessly supply the energy storage unit 94 with energy, in particular at least during a charging operation. The energy interface 94 is intended to wirelessly output energy to at least one object 26 and/or to an autonomous locomotion device 106 in order to make it possible to recharge an energy storage unit, in particular a rechargeable battery, of the object 26 and/or of the autonomous locomotion device 106.

Figure 7:
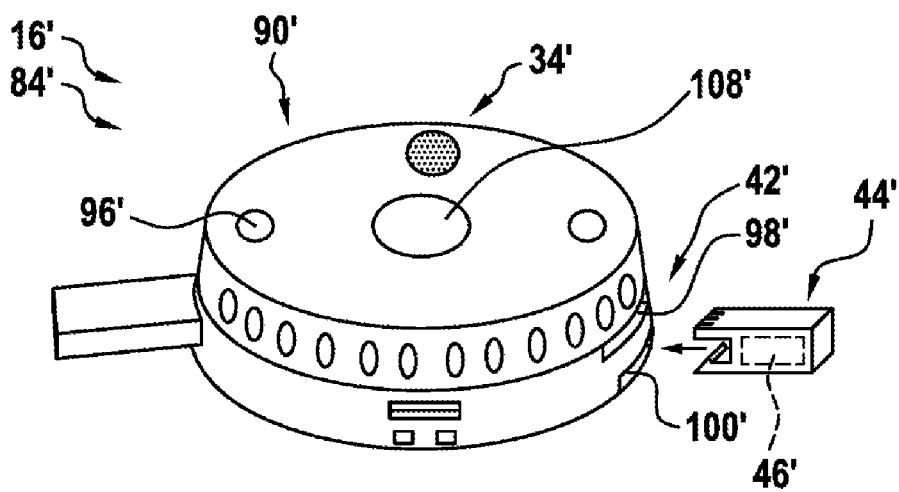
FIG. 7 shows a schematic illustration of a detailed view of an alternative configuration of the building infrastructure apparatus according to the disclosure in the form of a fire and/or smoke detector.

FIG. 7 shows a detailed view of a further exemplary embodiment of a building infrastructure apparatus 16' of the system 10 in the form of a fire and/or smoke detector 84'. The building infrastructure apparatus 16' illustrated in FIG. 7 has an at least substantially similar configuration to the building infrastructure apparatus 16 illustrated in FIG. 6. In contrast to the building infrastructure apparatus 16 illustrated in FIG. 6, the building infrastructure apparatus 16' illustrated in FIG. 7 comprises at least one interface unit 42' which is intended for a releasable connection, in particular for a connection which can be released in a non-destructive manner, to an expansion apparatus 44' which comprises at least one communication unit 46' for communicating electronic data with at least the external functional module 12. The expansion apparatus 44' is intended to retrofit the building infrastructure apparatus 16' illustrated in FIG. 7 with the communication unit 46'. The interface unit 42' is arranged on an outer side of a housing unit 90' of the building infrastructure apparatus 16'. The interface unit 42' comprises at least one data contact element 98' for connecting the expansion apparatus 44' to the building infrastructure apparatus 16' using data transmission technology. The expansion apparatus 44' is in the form of a plug-in module. The interface unit 42' also comprises at least one fixing element 100' for connecting the expansion apparatus 44' to the building infrastructure apparatus 16' in a form-fitting and/or force-fitting manner. With respect to further features and functions of the building infrastructure apparatus 16', reference may be made to the description of the building infrastructure apparatus 16 illustrated in FIG. 6.

Figure 8:
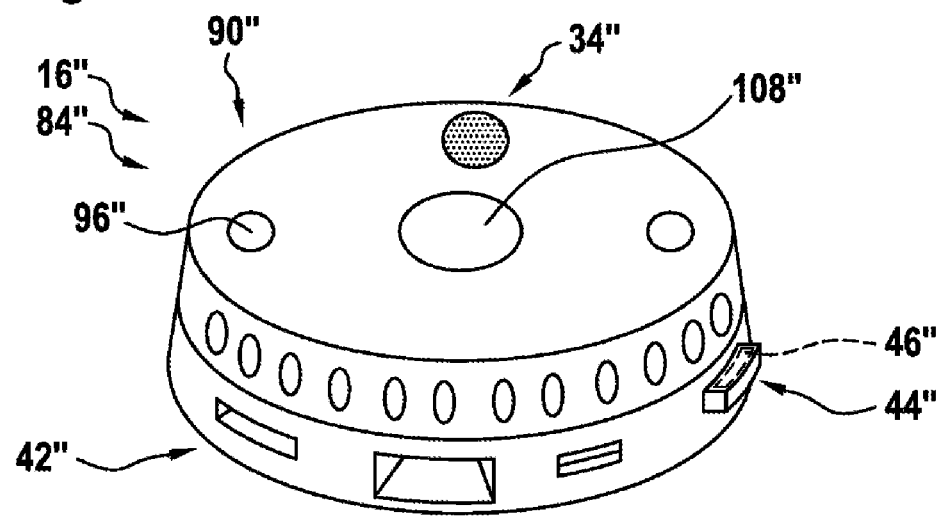
FIG. 8 shows a schematic illustration of a detailed view of a further alternative configuration of the building infrastructure apparatus according to the disclosure in the form of a fire and/or smoke detector.

FIG. 8 shows a detailed view of a further exemplary embodiment of a building infrastructure apparatus 16" of the system 10 in the form of a fire and/or smoke detector 84". The building infrastructure apparatus 16" illustrated in FIG. 8 has an at least substantially similar configuration to the building infrastructure apparatus 16' illustrated in FIG. 7. In contrast to the building infrastructure apparatus 16' illustrated in FIG. 7, the building infrastructure apparatus 16" illustrated in FIG. 8 comprises at least one interface unit 42" which, in addition to a connection to an expansion apparatus 44", has further interfaces for connecting various units and/or apparatuses to the building infrastructure apparatus 16". The further interfaces of the interface unit 42" are in the form of a USB interface and an SD card interface. By means of the further interfaces, data backup can be advantageously enabled directly at the building infrastructure apparatus 16" or software components can be individually supplied. With regard to further features and functions of the building infrastructure apparatus 16", reference may be made to the description of the building infrastructure apparatus 16' illustrated in FIG. 7.

Figure 9:
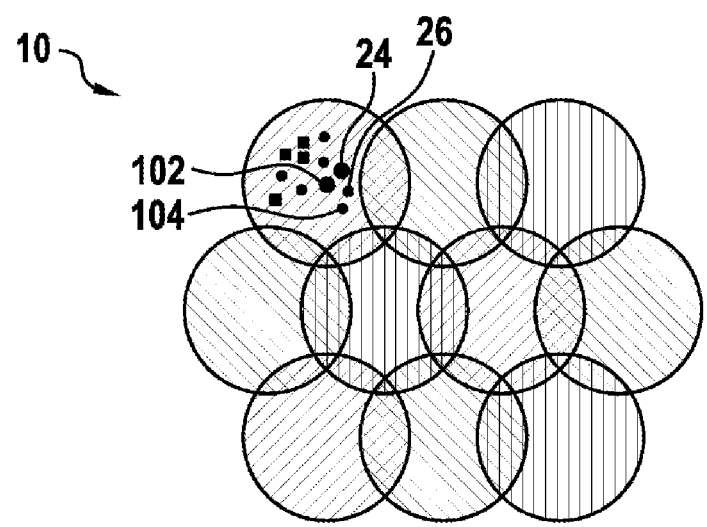
FIG. 9 shows a schematic illustration of an arrangement of a multiplicity of building infrastructure apparatuses according to the disclosure of the system according to the disclosure for subdividing a region into cells, a plurality c individuals and objects being together in one of the cells.

FIG. 9 shows an arrangement of a multiplicity of building infrastructure apparatuses 16 of the system 10 for subdividing a region into cells, a plurality of individuals 24 and objects 26 being together in a cell. Each of the cells corresponds to a monitoring region, in particular a communication region, of an individual building infrastructure apparatus 16 of the system 10. The cells at least partially overlap in order to enable reliable coverage. A method at least for locating and/or at least for monitoring at least one object 26 and/or at least one individual 24 by means of the system 10 is described below. In at least one method step, at least one object 26, on which the functional module 12 is arranged, is assigned to an individual 24, on whom at least one further functional module (not illustrated in any more detail here) of the system 10 is arranged, in an at least partially automatic manner at least on the basis of a common movement of the object 26 and of the individual 24.

In FIG. 9, two individuals 24, 102 and a multiplicity of objects 26, 104 are together in a cell which represents an individual room, for example. It is conceivable for the room to be a tool issuing room, for example, and for the individuals 24, 102 to receive the objects 26, 104 in this room, which objects may be in the form of portable machine tools 28, items of safety clothing 30 or the like, for example. At least one functional module 12 of the system 10 is arranged on each of the objects 26, 104. It is also conceivable for at least one further functional module (not illustrated in any more detail here) of the system 10 to be respectively arranged on each individual 24, 102, for example a further functional module of the system 10 which is integrated in a wristwatch, a smartphone, a pulse monitor or the like. If the individuals 24, 102 move together with the objects 26, 104 from one cell to a further cell, for example as a result of leaving a room and then entering a further room, it is possible to assign which object 26, 104 and which individual 24, 102 are together in a cell (FIG. 10) on account of communication between the functional modules 12 and the individual building infrastructure apparatuses 16 which predefine the cells. The control and/or regulation unit 20 can be used to preassign objects 26, 204 to individuals 24, 102, at least on the basis of data transmitted between the functional modules 12 and the building infrastructure apparatuses 16, on account of a temporal sequence in which the corresponding cell is entered.

Figure 10:
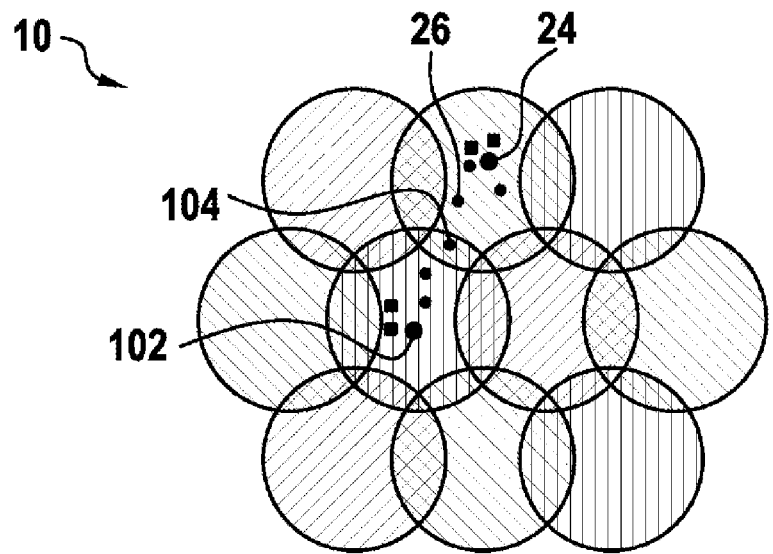
FIG. 10 shows a schematic illustration of the arrangement according to FIG. 9, in which case the individuals and objects are at least partially in different cells.

In order to check and/or correct the preassignment, it is useful to take into account at least one further characteristic variable in addition to the temporal sequence of entry. According to the method at least for locating and/or at least for monitoring at least one object 26 and/or one individual 24, a movement history is used in at least one method step to assign at least one object 26, on which the functional module 12 is arranged, to an individual 24. As a result of the objects 26, 104 and the individuals 24, 102 moving into at least partially different cells or different monitoring regions of different building infrastructure apparatuses 16 of the system 10, it is possible to assign objects 26, 104 to a single individual 24, 102 who is in an individual cell together with corresponding objects 26, 104 (FIG. 10). The objects 26, 104 which are in an individual cell together with a single individual 24, 102 are identified as an individual cluster, in particular by the control and/or regulation unit 20, by means of the method at least for locating and/or at least for monitoring.

Figure 11:
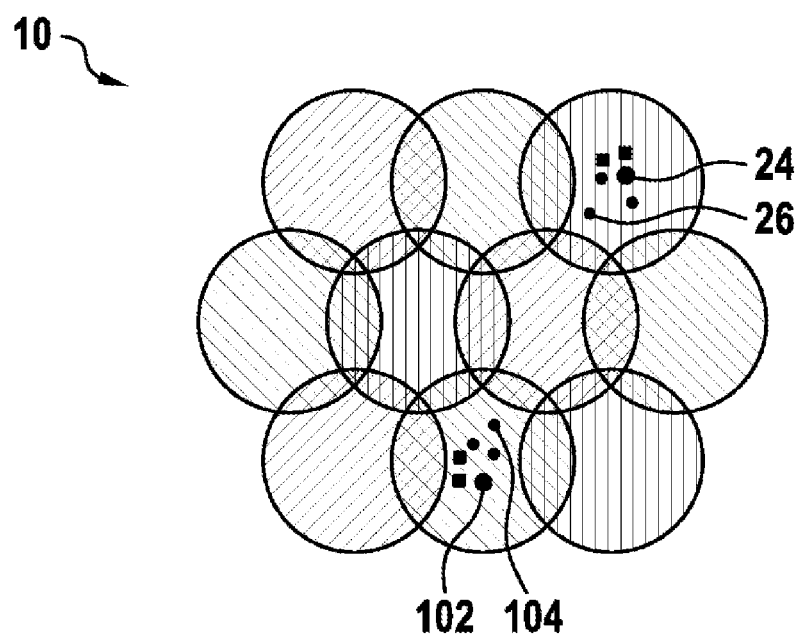
FIG. 11 shows a schematic illustration of the arrangement according to FIG. 9, in which case the individuals and the objects are completely in different cells.

In particular, as a result of cells overlapping and/or as a result of tolerance in the communication between the functional modules 12 and the building infrastructure apparatuses 16 of the system 10, it is possible for an individual object 104, for example, to not be able to be reliably assigned, in particular since it is arranged in monitoring regions of two different building infrastructure apparatuses 16 of the system 10 (FIG. 10). As a result of a further common movement of the objects 26, 104 and the individual 24, 102 assigned to the corresponding objects 26, 104 into further different cells, it is possible to uniquely assign the objects 26, 104 to a corresponding individual 24, 102 on account of the movement history (FIG. 11). The objects 26 are in an individual cell together with the individual 24 at one time and the further objects 104 are in another cell together with the further individual 102 at the same time. The control and/or regulation unit 20 can be used to infer a unique affiliation of the objects 26 to the individual 24 and a unique affiliation of the further objects 104 to the further individual 102.

The control and/or regulation unit 20 assigns the objects 26 to the individual 24 on account of the common movement of the objects 26 together with the individual 24 over the at least substantially entire movement history. In particular, the objects 26 are identified, together with the individual 24, as an associated cluster by the control and/or regulation unit 20. The further objects 104 are also assigned to the further individual 102 on account of the common movement of the further objects 104 together with the further individual 102 over the at least substantially entire movement history. In particular, the further objects 104 are identified, together with the further individual 102, as an associated further cluster by the control and/or regulation unit 20. On account of the movement history of the objects 26, 104 and of the individuals 24, 102 being taken into account, it is advantageously possible to reliably assign objects 26, 104 to the respective individual 24, 102 who has moved together with the respective objects 26, 104 over the at least substantially entire movement history. The assignment of the objects 26, 104 to the corresponding individual 24, 102 which has been carried out is maintained in the system 10 until a change, for example inclusion of a further object 26, 104, discarding of an object 26, 104 or the like.

In at least one method step, an access authorization for a working region or for a room and/or a work authorization to use the object 26 is/are given at least on the basis of an assignment of at least one object 26 to at least one individual 24. Furthermore, in at least one method step, information is output by means of the output unit 32 of the functional module 12 and/or by means of the output unit 34 of the building infrastructure apparatus 16 on the basis of an assignment of at least one object 26 to at least one individual 24. If, for example, both individuals 24, 102 are together in a cell for the purpose of carrying out maintenance and/or service work, it is known, from the movement history, in particular on account of objects 26, 104 being assigned to the corresponding individual 24, 102, which objects 26, 104 are carried by which individual 24, 102. If, for example, an item of safety clothing 30 in the form of protective glasses is prescribed for the purpose of carrying out the maintenance and/or service work in the cell and only one of the individuals 24, 102 is wearing an object 26 in the form of protective glasses according to the assignment, only this individual 24 is allowed to carry out the maintenance and/or service work. The individual 24 wearing the object 26 in the form of protective glasses can be enabled to activate a portable machine tool 28, for example on account of communication between the functional module 12 of the building infrastructure apparatus 16, and/or only said individual is allowed to access the cell in which maintenance and/or service work can be carried out. An item of information relating to a procedure, for example an instruction to obtain protective glasses during the issuing of tools, to put on protective glasses arranged in the cell and to subsequently confirm that the protective glasses have been put on, or other information which appears to be useful to a person skilled in the art, can be output by means of the output unit 32 of the functional module 12 and/or by means of the output unit 34 of the building infrastructure apparatus 16 for the individual 102 who is not wearing an object 104 in the form of protective glasses.

The system 10 described above and/or the method described above is/are not restricted to use in a portable power tool area. It can also be used, for example, in an office area, as shall be briefly explained using the following example. If an individual 24 is invited to a meeting, for example, and is supposed to bring a particular object 26, for example a facilitator's toolbox, a script, a laptop or the like, this can be monitored using the system 10. An invitation to the meeting can be electronically stored inside the system 10. Therefore, all information relating to the meeting is available in the system 10. It is also possible to check, by comparing a movement profile of the individual 24 and a movement profile of the object 26, whether the individual 24 is carrying the object 26. If it is detected that the individual 24 is not carrying the object 26, a corresponding item of information can be output by means of the output unit 32 of the functional module 12, which is arranged on the individual 24 in particular, by means of the output unit 34 of the building infrastructure apparatus 16 and/or by means of an output unit (not illustrated in any more detail here) of the external unit 36 which is in the form of a smartphone belonging to the individual 24, for example, and communicates with the building infrastructure apparatus 16.

The method can be additionally also used in the private sector. For example, an electronic timetable may be stored in the system 10 for an individual 24 and therefore also what type of books need to be carried on which day. If, for example, on account of objects 26 being assigned to the individual 24, it is determined on the way from a nursery to a kitchen that a book is not carried, this information can be transmitted, for example on account of communication of the building infrastructure apparatus 16, to an external unit 36 which is in the form of a smart front door or a smart cloakroom and acoustically and/or optically informs the individual that a book is missing, for example when putting on shoes, a jacket or the like. If the individual 24 does not react, the smart front door can block exit and a further notice which must be acknowledged, for example, can be displayed on the smart front door, or the book is fetched.

The invention claimed is:

1. A portable power tool system comprising:
   at least one mobile functional module having at least one communication unit configured to communicate electronic data;
   at least one building infrastructure apparatus having at least one communication unit configured to communicate with the at least one mobile functional module; and
   at least one control and regulation unit configured to determine at least a position of the at least one mobile functional module based on an evaluation of communication between the at least one mobile functional module and the at least one building infrastructure apparatus,
   wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
   wherein the at least one control and regulation unit is configured to actively intervene in control and regulation of a portable machine tool on which the at least one mobile functional module is arranged, using the at least one mobile functional module at least based on data transmitted between the at least one mobile functional module and the at least one building infrastructure apparatus.

2. The system as claimed in claim 1, wherein the at least one mobile functional module has at least one sensor unit configured to record the at least one of (i) the at least one object-specific characteristic variable, (ii) the at least one operator-specific characteristic variable, and (iii) the at least one environment-specific characteristic variable in an at least partially automatic manner.

3. The system as claimed in claim 1, wherein the at least one control and regulation unit is configured to evaluate at least one of (i) a vital state of an individual, (ii) a burden on an individual, and (iii) a potential risk to an individual at least based on data transmitted between the at least one mobile functional module and the at least one building infrastructure apparatus.

4. The system as claimed in claim 1, wherein the at least one control and regulation unit is configured to at least one of monitor, enable, and block access of at least one of (i) an object on which the at least one mobile functional module is arranged and (ii) an individual on whom the at least one mobile functional module is arranged, to one of a working area and a room at least based on data transmitted between the at least one mobile functional module and the at least one building infrastructure apparatus.

5. The system as claimed in claim 1, wherein the at least one control and regulation unit is configured to output at least one item of information by using an output unit of at least one of the at least one mobile functional module the at least one building infrastructure apparatus at least based on data transmitted between the at least one mobile functional module and the at least one building infrastructure apparatus.

6. The system as claimed in claim 1, wherein the communication unit of the at least one building infrastructure apparatus is configured to transmit electronic data to an external unit which differs from the at least one mobile functional module.

7. A method for at least one of locating and monitoring at least one of at least one object and at least one individual using a portable power tool system, the method comprising:
   communicating between at least one mobile functional module of the portable power tool system and at least one building infrastructure apparatus of the portable power tool system, the at least one mobile functional module having at least one communication unit configured to communicate electronic data, the at least one building infrastructure apparatus having at least one communication unit configured to communicate with the at least one mobile functional module;
   determining, with at least one control and regulation unit of the portable power tool system, at least a position of the functional module based on an evaluation of communication between the at least one mobile functional module and the at least one building infrastructure apparatus; and
   at least one of (i) recording and (ii) transmitting to the at least one building infrastructure apparatus, with the at least one mobile functional module, at least one of at least one object-specific characteristic variable, at least one operator-specific characteristic variable, and at least one environment-specific characteristic variable.

8. The method as claimed in claim 7, further comprising: assigning at least one object, on which the at least one mobile functional module is arranged, to an individual in an at least partially automatic manner at least based on a common movement of the at least one object and of the individual.

9. The method as claimed in claim 7, further comprising: using a movement history to assign at least one object, on which the at least one mobile functional module is arranged, to an individual.

10. The method as claimed in claim 7, further comprising: providing at least one of (i) an access authorization for at least one of a working area and a room and (ii) a work authorization for using at least one object at least based on an assignment of at the least one object to at least one individual.

11. The method as claimed in claim 7, further comprising: outputting information using an output unit based on an assignment of at least one object to at least one individual.

12. A portable power tool system comprising:
at least one mobile functional module having at least one communication unit configured to communicate electronic data;
at least one building infrastructure apparatus having at least one communication unit configured to communicate with the at least one mobile functional module; and
at least one control and regulation unit configured to determine at least a position of the at least one mobile functional module based on an evaluation of communication between the at least one mobile functional module and the at least one building infrastructure apparatus,
wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
wherein the at least one control and regulation unit is configured to to monitor a presence of at least one of (i) at least one item of prescribed safety clothing and (ii) a combination of items of prescribed safety clothing at least based on data transmitted between the at least one mobile functional module and the at least one building infrastructure apparatus.

13. A portable power tool system comprising:
at least one mobile functional module having at least one communication unit configured to communicate electronic data;
at least one building infrastructure apparatus having at least one communication unit configured to communicate with the at least one mobile functional module; and
at least one control and regulation unit configured to determine at least a position of the at least one mobile functional module based on an evaluation of communication between the at least one mobile functional module and the at least one building infrastructure apparatus,
wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
wherein the at least one control and regulation unit configured to assign at least one object, on which the at least one mobile functional module is arranged, to an individual at least based on a common movement at least based on data transmitted between the at least one mobile functional module and the at least one building infrastructure apparatus.

14. A portable power tool system comprising:
at least one mobile functional module having at least one communication unit configured to communicate electronic data;
at least one building infrastructure apparatus having at least one communication unit configured to communicate with the at least one mobile functional module; and
at least one control and regulation unit configured to determine at least a position of the at least one mobile functional module based on an evaluation of communication between the at least one mobile functional module and the at least one building infrastructure apparatus,
wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
wherein the at least one mobile functional module is one of in a form of an autonomous locomotion device and arranged on an autonomous locomotion device.

15. A portable power tool system comprising:
at least one mobile functional module having at least one communication unit configured to communicate electronic data;
at least one building infrastructure apparatus having at least one communication unit configured to communicate with the at least one mobile functional module; and
at least one control and regulation unit configured to determine at least a position of the at least one mobile functional module based on an evaluation of communication between the at least one mobile functional module and the at least one building infrastructure apparatus,
wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
wherein the at least one building infrastructure apparatus includes at least one interface unit configured to connect to an expansion apparatus which comprises at least one communication unit configured to communicate electronic data with at least one external functional module.

16. The system as claimed in claim 15, wherein the at least one interface unit is configured to releaseably connect to the expansion apparatus.

17. A portable power tool system comprising:
at least one mobile functional module having at least one communication unit configured to communicate electronic data;
at least one building infrastructure apparatus having at least one communication unit configured to communicate with the at least one mobile functional module; and
at least one control and regulation unit configured to determine at least a position of the at least one mobile functional module based on an evaluation of communication between the at least one mobile functional module and the at least one building infrastructure apparatus,
wherein the at least one mobile functional module is configured to at least one of record and transmit to the at least one building infrastructure apparatus at least one of (i) at least one object-specific characteristic variable, (ii) at least one operator-specific characteristic variable, and (iii) at least one environment-specific characteristic variable, and
wherein the at least one building infrastructure apparatus includes at least one energy interface configured to at least one of wirelessly receive and wirelessly output electrical energy.

* * * * *